United States Patent
Cavalcanti et al.

(10) Patent No.: US 10,484,848 B2
(45) Date of Patent: Nov. 19, 2019

(54) SYSTEMS, METHODS, AND DEVICES FOR V2X SERVICES OVER WIRELESS WIDE AREA NETWORKS

(71) Applicant: INTEL CORPORATION, Santa Clara, CA (US)

(72) Inventors: Dave Cavalcanti, Beaverton, OR (US); Anna Lucia A. Pinhero, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 1 day.

(21) Appl. No.: 15/741,684

(22) PCT Filed: Feb. 24, 2016

(86) PCT No.: PCT/US2016/019232
§ 371 (c)(1),
(2) Date: Jan. 3, 2018

(87) PCT Pub. No.: WO2017/052683
PCT Pub. Date: Mar. 30, 2017

(65) Prior Publication Data
US 2018/0206089 A1    Jul. 19, 2018

Related U.S. Application Data

(60) Provisional application No. 62/222,579, filed on Sep. 23, 2015.

(51) Int. Cl.
*H04W 4/40* (2018.01)
*H04W 36/00* (2009.01)
(Continued)

(52) U.S. Cl.
CPC ............. *H04W 4/40* (2018.02); *H04W 4/046* (2013.01); *H04W 36/0083* (2013.01);
(Continued)

(58) Field of Classification Search
CPC ....... H04W 4/40; H04W 36/00; H04W 48/16; H04W 4/046; H04W 12/08
See application file for complete search history.

(56) References Cited

U.S. PATENT DOCUMENTS

2017/0331577 A1\* 11/2017 Parkvall ............... H04J 11/0079
2017/0331670 A1\* 11/2017 Parkvall ............ H04W 52/0274
(Continued)

OTHER PUBLICATIONS

3GPP TR 22.885, "3rd Generation Partnership Project; Technical Specification Group Services and System Aspects; Study of LTE Support for V2X Services (Release 14)", V1.0.0, Sep. 2015, 50 pages.
(Continued)

*Primary Examiner* — Diane D Mizrahi
(74) *Attorney, Agent, or Firm* — Stoel Rives LLP

(57) ABSTRACT

The present disclosure includes systems and methods that enable V2X communications over a wireless wide area network (WWAN). A registration request is sent to an intelligent transportation system (ITS) function. The registration request is for requesting authorization for a device to host a V2X service in a cellular network. A registration response is received from the ITS function. The registration response is for authorizing the device to host the V2X service in the cellular network. The V2X service is hosted in the cellular network via the ITS function.

16 Claims, 14 Drawing Sheets

(51) Int. Cl.
   *H04W 60/00* (2009.01)
   *H04W 48/16* (2009.01)
   *H04W 8/00* (2009.01)
   *H04W 48/12* (2009.01)
   *H04W 84/04* (2009.01)
   *H04W 4/04* (2009.01)

(52) U.S. Cl.
   CPC ........... *H04W 48/16* (2013.01); *H04W 60/00* (2013.01); *H04W 8/005* (2013.01); *H04W 48/12* (2013.01); *H04W 84/042* (2013.01)

(56) References Cited

U.S. PATENT DOCUMENTS

| | | | |
|---|---|---|---|
| 2018/0152819 A1* | 5/2018 | Pinheiro | H04W 4/40 |
| 2018/0159935 A1* | 6/2018 | Cavalcanti | H04W 4/44 |
| 2018/0295655 A1* | 10/2018 | Cavalcanti | H04W 4/46 |

OTHER PUBLICATIONS

NEC, "Deployment Scenarios of LTE-Based V2X", R1-154194, 3GPP TSG RAN WG1 Meeting #82, Beijing, China, Agenda Item 7.2.8.1.1, Aug. 24-28, 2015, 5 pages.

PCT/US2016/019232, International Search Report and Written Opinion, dated Aug. 9, 2016, 20 pages.

Qualcomm Incorporated, "V2X Communication in 3GPP", S1-144374, 3GPP TSG-SA WG1 Meeting #68, San Francisco, CA, US, Nov. 17-21, 2014, 8 pages.

TS 103 084, "Geomessaging Enabler", European Telecommunications Standards Institute, F-06921, No. V 0.0.3, Oct. 2012, 48 pages.

\* cited by examiner

SYSTEMS, METHODS, AND DEVICES FOR V2X SERVICES OVER WIRELESS WIDE AREA NETWORKS

RELATED APPLICATIONS

This application is a national stage filing under 35 U.S.C. § 371 of International Patent Application No. PCT/US2016/019232, filed Feb. 24, 2016, which claims the benefit of U.S. Provisional Patent Application No. 62/222,579, titled V2X IP SERVICES IN LTE/5G, filed Sep. 23, 2015, each of which is hereby incorporated by reference herein in its entirety.

TECHNICAL FIELD

The present disclosure generally relates to vehicular communication services, such as vehicle-to-vehicle (V2V), vehicle-to-pedestrian (V2P), and vehicle-to-infrastructure (V2I), which are sometimes referred to individually and collectively as vehicle-to-anything or vehicular communication (V2X).

BACKGROUND INFORMATION

Wireless mobile communication technology enables communication of mobile user equipment devices, such as smartphones, tablet computing devices, laptop computers, and the like. Mobile communication technology may enable connectivity of various types of devices, supporting the "Internet of things." Vehicles are one example of mobile user equipment that may benefit from connectivity over wireless mobile communication technology.

Wireless mobile communication technology uses various standards and protocols to transmit data between a base station and a wireless communication device. Wireless wide area network (WWAN) communication system standards and protocols can include, for example, the 3rd Generation Partnership Project (3GPP) long term evolution (LTE), and the IEEE 802.16 standard, which is commonly known to industry groups as worldwide interoperability for microwave access (WiMAX). Wireless local area network (WLAN) can include, for example, the IEEE 802.11 standard, which is commonly known to industry groups as Wi-Fi. Other WWAN and WLAN standards and protocols are also known.

DETAILED DESCRIPTION

Figure 1:
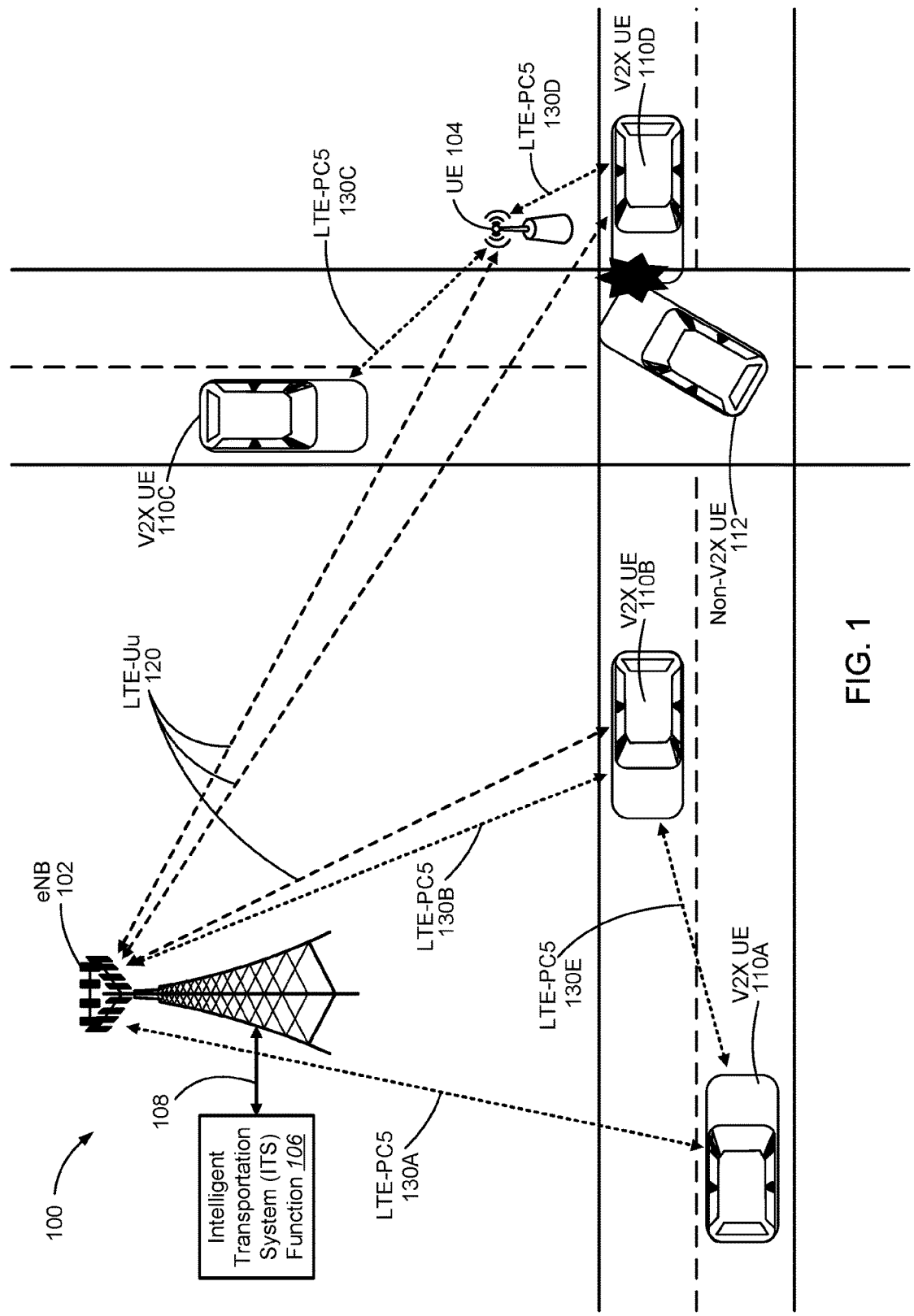
FIG. 1 illustrates one example of an environment in which the present systems and methods may be implemented.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the disclosed embodiments. However, it will be apparent to those skilled in the art having the benefit of the present disclosure that the various aspects of the embodiments may be practiced in other examples that depart from these specific details. In certain instances, descriptions of well-known devices, circuits, and methods are omitted so as not to obscure the description of the embodiments with unnecessary detail.

In 3GPP radio access networks (RANs) in LTE systems, a base station may include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE). In LTE networks, an E-UTRAN may include a plurality of eNBs and may communicate with a plurality of UEs. An evolved packet core (EPC) may communicatively couple the E-UTRAN to an external network, such as the internet. LTE networks include radio access technologies (RATs) and core radio network architecture that can provide high data rate, low latency, packet optimization, and improved system capacity and coverage.

In homogeneous networks, a node, also called a macro node or macro cell, may provide basic wireless coverage to wireless devices in a cell. The cell may be the area in which the wireless devices can communicate with the macro node. Heterogeneous networks (HetNets) may be used to handle the increased traffic loads on the macro nodes due to increased usage and functionality of wireless devices. HetNets may include a layer of planned high power macro nodes (macro-eNBs or macro cells) overlaid with layers of lower power nodes (small cells, small-eNBs, micro-eNBs, pico-eNBs, femto-eNBs, or home eNBs (HeNBs)) that may be deployed in a less well-planned or even entirely uncoordinated manner within the coverage area (cell) of a macro node. The lower power nodes may generally be referred to as "small cells," small nodes, or low power nodes. HetNets may also include various types of nodes utilizing varying types of RATs, such as LTE eNBs, 3G NodeBs, Wi-Fi APs, and WiMAX base stations.

As used herein, the terms "node" and "cell" are both intended to be synonymous and refer to a wireless transmission point operable to communicate with multiple wireless mobile devices, such as a UE, or another base station. Furthermore, cells or nodes may also be Wi-Fi access points (APs), or multi-radio cells with Wi-Fi/cellular or additional RATs. For example, nodes or cells may include various technologies such that cells operating on different RATs are integrated in one unified HetNet.

Vehicular communication is a relatively new and rapidly emerging research and development area opening new market opportunities for wireless communication systems. Vehicular communication can include vehicle-to-vehicle (V2V) (e.g., communication between a vehicle and another vehicle); vehicle-to-pedestrian (V2P) (e.g., communication between a vehicle and a device carried by an individual, such as a pedestrian, cyclist, driver, or passenger); and vehicle-to-infrastructure (V2I) (e.g., communication between a vehicle and a road side unit (RSU), which is a transportation infrastructure entity, for example, an entity transmitting speed notifications), which are individually and/or collectively referred to as vehicle-to-anything (V2X) communications.

Intelligent Transportation Systems (ITS) enabled by connected vehicles can improve safety and efficiency in roadways. The range of applications for V2X communication in ITS varies from road safety and vehicular traffic management to applications enabling infotainment, the vision of a "connected car," and "autonomous driving."

The Wireless Access in Vehicular Environments (WAVE) architecture and standards has been developed to support ITS safety and non-safety applications. WAVE has traditionally relied on Institute of Electrical and Electronics Engineers (IEEE) 802.11p, aka Dedicated Short Range Communications (DSRC), to support vehicle to anything (V2X) communications. DSRC/802.11p was specifically designed for vehicular communication and utilizes portions of the 5.9 GHz spectrum which have been dedicated for ITS.

Many ITS applications require the widespread deployment of DSRC/802.11p infrastructure to provide meaningful function. For example, many ITS applications require the deployment of DSRC/802.11p-based Road Side Units (RSU) (e.g., an entity supporting V2X service). However, the requirement of widespread deployment of infrastructure imposes scalability and deployment cost challenges. Unfortunately, the deployment of needed DSRC/802.11p infrastructure has been lacking. This has led to the consideration of alternative wireless systems. In particular, existing cellular systems, such as LTE, are being considered as an alternative to DSRC/802.11p due to their large scale coverage and efficient spectrum utilization.

The study of direct communication between devices was addressed in the 3rd Generation Partnership Project (3GPP) in the area of Proximity Services (ProSe). The current working assumption in the 3GPP standards is that the communication between the UE and the RSU may be done using ProSe/D2D (i.e., over the PC5 interface) and that the RSU functionality will be implemented in the service/application layer in the UE or eNB. Optionally the communication between the UE and the RSU may be done via the wireless Uu interface (interface between UE and eNodeB). The procedures disclosed herein are assuming PC5 interface is used for communication between the UE and the RSU, but same procedures can apply in case the Uu interface is used. Given that V2X safety applications and services provided by RSUs may require delays as low as 1 ms, UEs should be able to discover and get authorization for V2X services from an RSU within very low latencies. Such services should also be supported reliably under high mobility.

However, to date, the main drivers for the existing ProSe architecture and protocols have been public safety (e.g., voice communication between emergency responders) and consumer applications (e.g., advertisement, location information, social networks). Unfortunately, existing LTE ProSe functionality and protocols are not scalable to efficiently to meet the requirements of V2X communications in terms of latency and number of vehicles supported. Accordingly, improvements are needed. In particular, there is a need for efficient procedures to discover a UE or an eNB that is operating as an RSU.

The disclosed systems and methods provide for a registration and authorization procedure for enabling UEs or eNBs to operate as an RSU. In addition to enabling a UE or an eNB to operate as an RSU, the disclosed systems and methods enable a UE or an eNB to host V2X safety IP services, including providing for a V2X service advertisement method and mobility management protocols for providing seamless connectivity to V2X services.

In some embodiments, the V2X service advertisement method includes having a V2X function in the core network provide a list of RSUs and corresponding services to UEs. Additionally or alternatively, the UEs or eNBs may broadcast V2X service capabilities that enable V2X UEs to identify RSUs supporting V2X IP services with low overhead and latency. A mobility management protocol for providing seamless connectivity to V2X services is also proposed. Accordingly, the systems and methods disclosed herein may enable V2X UEs to discover and maintain connectivity to V2X services with low overhead and latency.

Therefore, V2X services may be provided over wireless wide area networks (WWANs) (e.g., cellular networks). In some embodiments, V2X services will use the ProSe/device-to-device (D2D) architecture with the enhancement needed to support the transmission of V2X messages. These V2X messages may be IP messages and the V2X services may be IP-based applications that are carried on the user plane of a PC5 direct communication interface.

In one example, a UE communicates with a UE or an eNB that is configured to be a Road Side Unit (RSU) (a vehicle to infrastructure (V2I) scenario, for example). In this example, the UE or eNB that is operating as an RSU receives safety messages from one UE and relays the safety message to another UE. In some cases, this relaying of safety messages is performed as part of a service provided by an intelligent transportation system (ITS) server (the relaying may be carried out according to the configuration/functionality of the service, for example).

As used herein, a V2X UE may be a UE that supports ProSe and V2X enabling features. As used herein, a V2X ProSe function may be V2X specific functionality that may be part of the ProSe function or stand alone.

Referring now to the figures, FIG. 1 illustrates one example of an environment 100 in which the present systems and methods may be implemented. The environment 100 includes one or more vehicles (e.g., V2X UEs) 110 that are able to operate as a user equipment (UE) that supports both ProSe and V2X communication. As illustrated in FIG. 1, V2X UEs 110B and 110D are connected to an evolved Node B (eNB) 102 via an LTE-Uu interface 120, while V2X UEs 110A and 110C are not be connected to the eNB 102 (e.g., they may be connected to a different eNB via an LTE-Uu interface 120 or may not be connected to any eNB via an LTE-Uu interface 120). As illustrated in FIG. 1, V2X UEs 110A-D are each connected to a device (e.g., eNB 102 or UE 104) via an LTE-PC5 interface 130. For example, V2X UE 110A is connected to the eNB 102 via LTE-PC5 interface 130A, V2X UE 110B is connected to the eNB 102 via LTE-PC5 interface 130B, V2X UE 110C is connected to the UE 104 via LTE-PC5 interface 130C, V2X UE 110D is connected to the UE 104 via LTE-PC5 interface 130D, and V2X UE 110A is connected to V2X UE 110B via LTE-PC5 interface 130E. In one example, LTE-PC5 interfaces 130 is used for the control plane and the user plane for ProSe Direct Discovery, ProSe Direct Communication, and/or ProSe UE-to-Network Relay.

The environment 100 additionally includes an Intelligent Transportation System (ITS) function 106 which provides V2X services. In some cases, the ITS function 106 may be implemented as part of a ProSe function. In other cases, the ITS function 106 may be implemented as part of a new entity within the cellular network. In yet other cases, the ITS function 106 may be external to the cellular network. The ITS function 106 may be implemented as an ITS server. As used herein, the terms ITS function and ITS server are interchangeable. The ITS function 106 may be connected to the eNB 102 via connection 108. Additionally or alternatively, the ITS function 106 may be connected to the UE 104 operating as an RSU. The environment 100 may also include one or more vehicles 112 that either do not support ProSe and/or V2X communication or are not able to operate as a UE.

In one example, the non-V2X UE 112 may turn into the path of V2X UE 110D causing a collision between the non-V2X UE 112 and the V2X UE 110D. It is appreciated that if the non-V2X UE 112 had been able to use V2X services and/or V2X communications, such a collision may have been avoided. Although the V2X UE 110D was not able to avoid a collision with the non-V2X UE 112, V2X services could be used to help other V2X UEs 110 be forewarned or even be rerouted away from the collision.

In one example, the V2X UE 110D that was involved in the collision may use a V2X service (e.g., hazard avoidance service, crash notification service, traffic rerouting service) that is provided by the ITS function 106 and hosted by the UE 104 to indicate that a collision has occurred. The UE 104 may be connected to the ITS function 106 via the LTE-Uu 120 connection and the connection 108. As illustrated in FIG. 1, the communication between the V2X UE 110D and the UE 104 is a direct ProSe/D2D connection over the LTE-PC5 interface 130D.

The ITS function 106 may provide relevant notifications of the collision to nearby V2X UEs 110 via particular V2X services. For example, V2X UE 110C receives notification via its LTE-PC5 130C connection with the UE 104 and V2X UEs 110A and 110B receive notifications via their respective LTE-PC5 interfaces 130 with the eNB 102. In some cases, the V2X UE 110B, which has both an LTE-PC5 interface 130B and an LTE-Uu interface 120, may access V2X services through either the LTE-PC5 interface 130B or the LTE-Uu interface 120. In other cases, the V2X UE 110B, which has both an LTE-PC5 interface 130B and an LTE-Uu interface 120, may access V2X services only through the LTE-PC5 interface 130B. For example, the PC5 interface 130B may be used for local V2X messaging (e.g., location specific, geographically limited, V2X messages). In yet other cases, the PC5 interface 130 may be used primarily for connections between UEs (e.g., V2X UEs 110, UEs 104) and V2X UEs 110A and 110B may access V2X services only through the LTE-Uu interface 120.

As is illustrated in FIG. 1, both the eNB 102 and the UE 104 host V2X services. For example, both the eNB 102 and the UE 104 act as a Road Side Unit (RSU) for purposes of hosting V2X services and enabling V2X communication.

Figure 2:
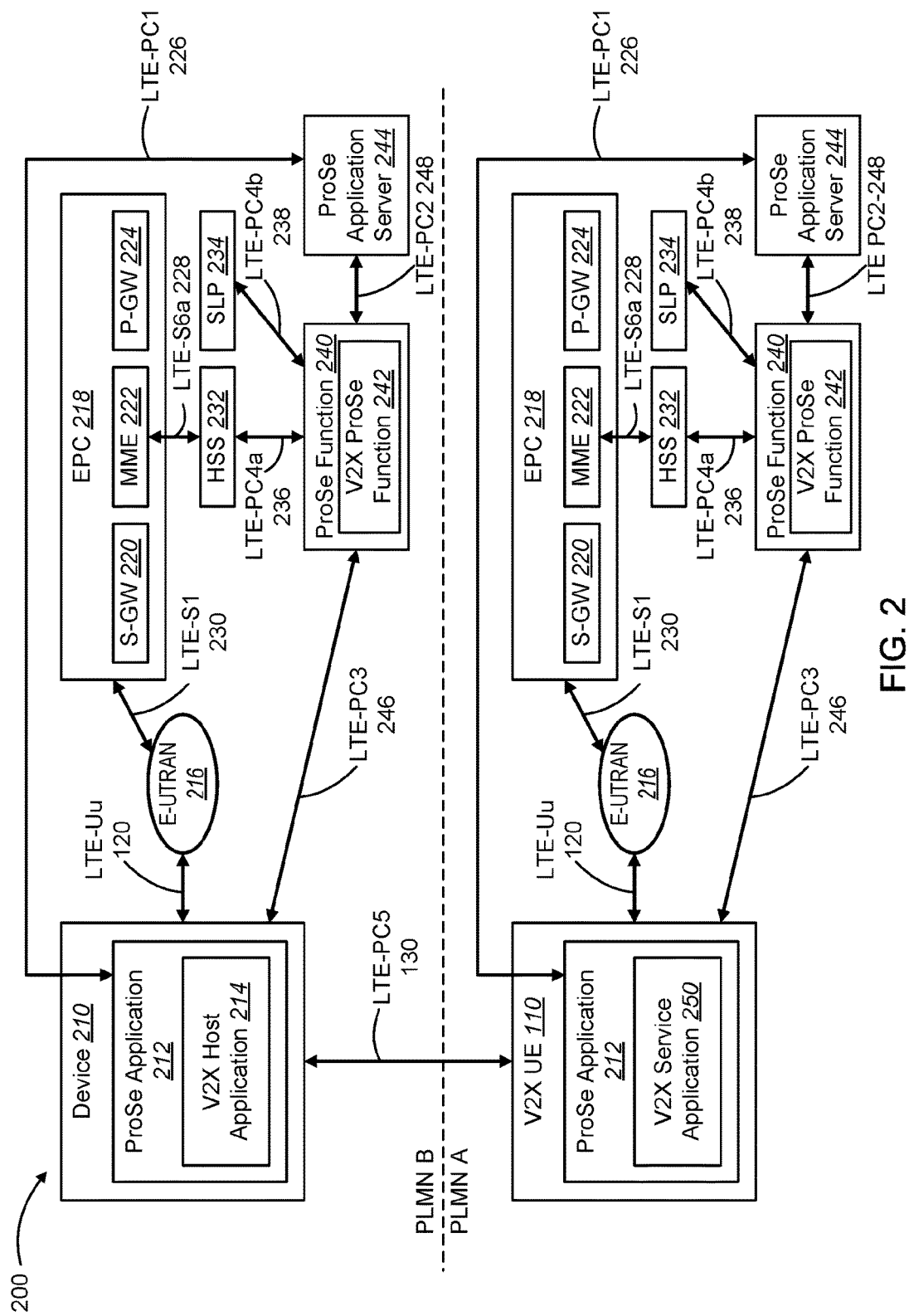
FIG. 2 is a block diagram illustrating one example of how the V2X services may be incorporated into the inter-PLMN ProSe reference architecture.

FIG. 2 is a block diagram illustrating one example of how the V2X services may be incorporated into the inter-PLMN ProSe reference architecture 200. A V2X UE 110 includes a ProSe application 212. The ProSe application 212 enables efficient device-to-device (D2D) discovery and communication. In some cases, the ProSe application 212 manages ProSe functionality based on a preconfigured (e.g., PLMN specific) ProSe configuration. The ProSe application 212 includes a V2X service application 250. The V2X service application 250 enables the V2X UE 110 to perform V2X communication using ProSe (over the LTE-PC5 interface, for example).

The V2X UE 110 is coupled to the E-UTRAN 216 via an LTE-Uu interface 120. The E-UTRAN 216 includes one or more eNBs (not shown). The E-UTRAN 216 is connected to the evolved packet core (EPC) 218 via the LTE-S1 interface 230. The EPC 218 includes a serving gateway (S-GW) 220, a mobility management entity (MME) 222, and a packet gateway (P-GW) 224. The MME 222 is connected to the home subscriber server (HSS) 232 via the LTE-S6a interface 228 and the HSS 232 is connected to the ProSe function 240 via the LTE-PC4a interface 236. In one example, the LTE-S6a interface 228 is used to download ProSe related subscription information to the MME 222 during an E-UTRAN attach procedure or to inform the MME 222 that the subscription information in the HSS 232 has changed. In one example, the LTE-PC4a interface 236 is used to provide subscription information to the ProSe function 240 in order to authorize access for ProSe Direct Discovery and ProSe Direct Communication on a per PLMN basis. In some cases, the LTE-PC4a interface 236 is also used by the ProSe function 240 (i.e., EPC-level ProSe Discovery Function) for retrieval of EPC-level ProSe Discovery related subscriber data.

The ProSe function 240 is also connected to the secure user plane location (SUPL) Location Platform (SLP) 234 via the LTE-PC4b interface 238. In one example, the LTE-PC4b interface 238 is used by the ProSe function 240 (i.e., EPC-level ProSe Discovery Function) in the role of LCS client to query the SLP defined in the open mobile alliance (OMA) AD SUPL. Using the information from the HSS 232 and the SLP 234, the ProSe function 240 is able to manage ProSe services. The ProSe function 240 is connected to the V2X UE 110 via the LTE-PC3 interface 246. In one example, the LTE-PC3 interface 240 relies on the EPC 218 user plane for transport (i.e., an "over IP" reference point). In some cases, the LTE-PC3 interface 246 is used to authorize ProSe Direct Discovery and EPC-level ProSe Discovery requests, and perform allocation of ProSe Application Codes corresponding to ProSe Application Identities used for ProSe Direct Discovery. Additionally or alternatively, the LTE-PC3 interface 246 is used to define the authorization policy per PLMN for ProSe Direct Discovery (for public safety and non-public safety) and communication (for public safety only) between the V2X UE 110 and ProSe Function 240.

The ProSe function 240 is also connected to a ProSe application server 244 via the LTE-PC2 interface 248. In one example, the LTE-PC2 interface 248 is used to define the interaction between the ProSe application server 244 and the ProSe functionality provided by the 3GPP EPS via the ProSe function 240 (e.g., name translation) for EPC-level ProSe discovery. The ProSe application server 244 is connected with the ProSe application 212 via the LTE-PC1 interface 226. In one example, the LTE-PC1 interface 226 is used to define application level signaling requirements. The ProSe application 212 manages ProSe services based on general (e.g., per PLMN) ProSe configuration. The ProSe application 212 may also manage application level signaling based on received signaling requirements.

As illustrated in FIG. 2, the ProSe function 240 includes a V2X ProSe function 242 which, in combination with a V2X service application 250 within the ProSe application 212, enables the V2X UE 110 to use ProSe for V2X services and V2X communication.

A device 210, which may be another V2X UE (e.g., V2X UE 110), an eNB (e.g., eNB 102), or a UE (e.g., a UE 104), may have a similar ProSe architecture. In some cases, the device 210 uses a different application than the V2X UE 110. For example, the ProSe application 212 of the device 210 includes a V2X host application 214. The V2X host application 214 enables the device 210 to host V2X services that are provided by an intelligent transportation system. The V2X host application 214 also enables the device 210 to perform the registration and authentication to become an RSU and to operate as an RSU using ProSe (over the LTE-PC5 interface, for example). In some cases, V2X communication is enabled via one or more V2X services that are hosted using the V2X host application 214.

As illustrated in FIG. 2, the V2X UE 110 is connected to the device 210 via an LTE-PC5 interface 130. Although the V2X UE 110 and the device 210 are illustrated as being in different public land mobile networks (PLMNs) (e.g., PLMN A, PLMN B), it is understood that the V2X UE 110 and the device 210 may be in the same PLMN. Although not shown, an LTE-PC6 interface is between ProSe functions in different PLMNs (EPC-level ProSe Discovery) or between the ProSe function in the HPLMN and the ProSe function in a local PLMN (ProSe Direct Discovery). With ProSe Direct Discovery this LTE-PC6 interface is used for HPLMN control of ProSe service authorization. Additionally or alternatively, the LTE-PC6 interface is used to authorize ProSe Direct Discovery requests, retrieve the Discovery Filter(s) corresponding to ProSe Application ID name(s), and translate the ProSe application code to the ProSe Application ID name. As is illustrated in FIG. 2, the ProSe architecture may be substantially similar for both the V2X UE 110 and the device 210. It is also noted that the LTE-PC5 interface 130 is independent of any interface between the V2X UE 110 and the E-UTRAN 216.

Figure 3:
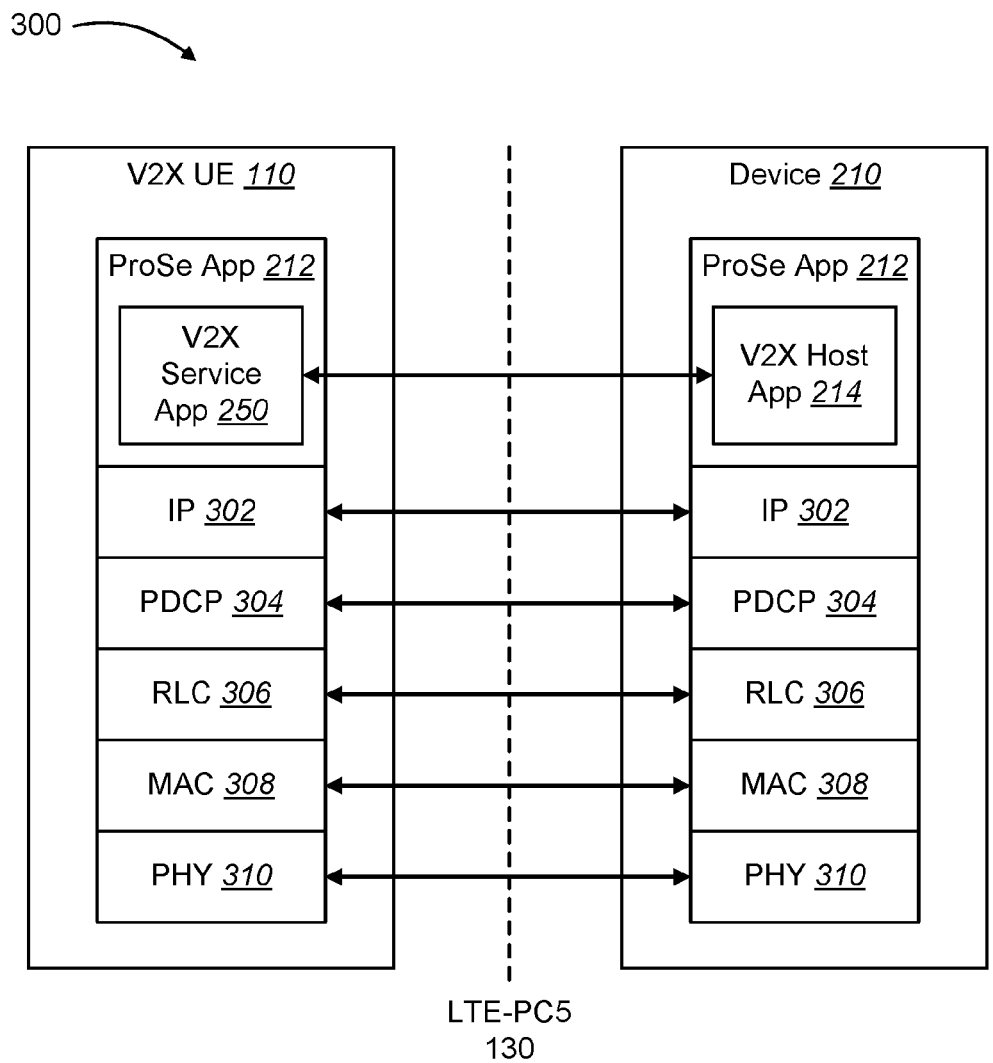
FIG. 3 is a block diagram illustrating one embodiment of the V2X service application and the V2X host application in a ProSe environment.

FIG. 3 is a block diagram illustrating one embodiment of the V2X service application 250 and the V2X host application 214 in a ProSe environment 300. The V2X UE 110 communicates with the device 210 via the LTE-PC5 interface 130. The LTE-PC5 interface 130 may also be referred to as a ProSe interface, D2D interface, or direct interface. The V2X UE 110 and the device 210 each have a communication architecture for communicating over the LTE-PC5 interface 130. For example, the V2X UE 110 and the device 210 each include a physical (PHY) layer 310, a medium access control (MAC) layer 308, a radio link control (RLC) layer 306, a packet data convergence protocol (PDCP) layer 304, and an internet protocol (IP) layer 302. Both the V2X UE 110 and the device 210 also include an application layer that includes a ProSe application 212.

The ProSe application 212 in the device 210 includes a V2X host application 214, and the ProSe application 212 in the V2X UE 110 includes a V2X service application 250. The V2X host application 214 and the V2X service application 250 communicate over the LTE-PC5 interface 130 via the IP layer 302. In some embodiments, the V2X host application 214 additionally or alternatively communicates over an LTE-Uu interface 120 (e.g., the LTE user plane).

Device 210, which may be a UE (e.g., V2X UE 110), a UE (e.g., UE 104), or an eNB (e.g., eNB 102), may operate as an RSU and host V2X communication via ProSe. The V2X host application 214 enables the device 210 to operate as an RSU and host V2X communication, including one or more V2X services, using ProSe (as part of the ProSe application 212, for example).

V2X UE 110 uses one or more V2X services hosted by the device 210 to communicate V2X messages via ProSe. The V2X service application 250 enables the V2X UE 110 to engage in V2X communication, including using one or more V2X services, via ProSe (as part of the ProSe application 212, for example).

Figure 4:
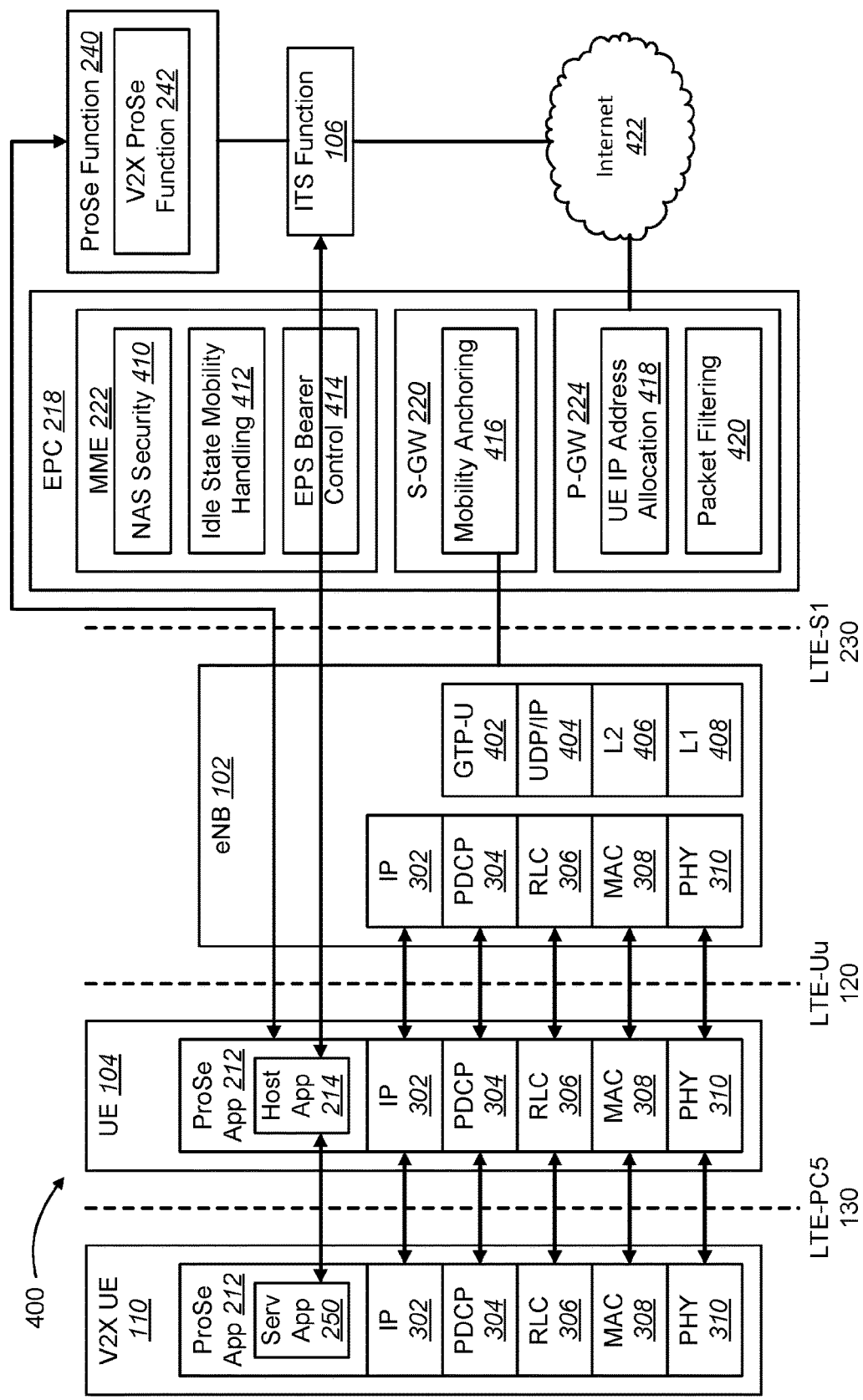
FIG. 4 is a block diagram illustrating one example of a UE connecting to a UE that is enabled to host a V2X service.

FIG. 4 is a block diagram illustrating one example 400 of a V2X UE 110 connecting to a UE 104 that is enabled to host a V2X service. As illustrated in FIG. 3, the V2X UE 110 and the UE 104 include a communication architecture for communicating over the LTE-PC5 interface 130. The eNB 102 similarly includes a communication architecture for communicating with a UE 104 over the LTE-Uu interface 120. The eNB 102 additionally includes a general packet radio service (GPRS) tunneling protocol user plane (GTP-U) layer 402, a user datagram protocol (UDP)/IP layer 404, a layer 2 (L2) layer 406, and a layer 1 (L1) layer 408 for communicating with the EPC 218 over the LTE-S1 interface 230.

The EPC 218 includes an MME 222, an S-GW 220, and a P-GW 224. The MME 222 includes a NAS security module 410, an idle state mobility handling module 412, and an EPS bearer control module 414. The S-GW 220 includes a mobility anchoring module 416. In some cases, the eNB 102 is coupled to the mobility anchoring module 416 in the S-GW 220. The P-GW 224 includes a UE IP address allocation module 418 and a packet filtering module 420. The P-GW 224 is connected to the internet 422.

As discussed with respect to FIG. 3, the UE 104 includes a ProSe application 212 that includes a V2X host application 214, and the V2X UE 110 includes a ProSe application 212 that includes a V2X service application 250. At least the ProSe application 212 of the UE 104 is connected to the ProSe function 240. The ProSe function 240 enables the ProSe application 212 to perform ProSe and configures the parameters of how the ProSe application 212 should operate. Even if the ProSe application 212 of the V2X UE 110 is not presently connected to a ProSe function 240, at some previous time, the ProSe application 212 would have received authorization to use the ProSe application 212 and the configuration and parameters for operating the ProSe function 240.

In some cases, the V2X host application 214 performs a registration and authorization procedure to operate as an RSU and host V2X service. The V2X host application 214 obtains an internet protocol (IP) address for hosting one or more V2X services. The obtained IP address is allocated to the V2X host application 214 from the P-GW 224. Using the obtained IP address, the V2X host application 214 establishes a connection with the ITS function 106 through the P-GW 224. The V2X host application 214 establishes a bearer with the ITS function 106, which is maintained via the EPS bearer control module 414.

The V2X host application 214 sends an authorization request to the ITS function 106 to verify that the UE 104 is authorized to provide V2X services. Examples of V2X services include hazard notification services, hazard avoidance services, traffic mitigation services, traffic rerouting services, smart cruise control services, pedestrian warning services, etc. In some cases, the request to register one or more V2X services is a request to operate as a road side unit (RSU). The authorization request may include the service capabilities and security information of the UE 104. The capabilities sent by the V2X host application 214 may include a list of hosted service identifiers (e.g., provider service identifier (PSID)) and associated service parameters.

In one example, the ITS function 106 is within the 3GPP domain. For example, the ITS function 106 may be part of the V2X ProSe function 242. In another example, the ITS function 106 is a separate server within the 3GPP domain. Alternatively, the ITS function 106 is outside of the 3GPP domain. For example, the ITS function 106 may be accessible via the internet 422. The IP address of the ITS function 106 may be found by the eNB 102 based on a domain name system (DNS) query using a pre-defined well known address.

Assuming that the UE 104 is a trusted device, the ITS function 106 provides an authorization response to the V2X host application 214 confirming that the V2X host application 214 within the UE 104 is authorized to operate as an RSU (e.g., V2X RSU) and host the requested V2X service(s).

Having received the authorization from the ITS function 106 to operate as an RSU and host one or more V2X services, the V2X host application 214 registers its V2X services with the ITS function 106. The V2X host application 214 sends its hosted service identifiers (e.g., PSID), IP address, link layer address (e.g., cell ID), and location information to the ITS function 106. The ITS function 106 processes the request and may authorize one or more V2X services based on the capability list and credentials provided by the V2X host application 214 (the capability list and credentials of the UE 104, in this case). In some cases, the ITS function 106 registers the V2X services and/or the V2X host application 214 with the V2X ProSe function 240.

Additionally or alternatively, the V2X host application 214 registers its V2X services with the V2X ProSe function 240. The V2X host application 214 sends its hosted service identifiers (e.g., PSID), IP address, link layer address (e.g., cell ID), and location information to the ProSe function 240. The ProSe function 240 processes the request and may authorize one or more V2X services based on the capability list and credentials provided by the V2X host application 214 (the capability list and credentials of the UE 104, in this case). In some cases, the V2X ProSe function 242 contacts the ITS function 106 to confirm the RSU registration of the V2X host application 214.

Once authorized, the V2X ProSe function 242 assigns an Application ID to each associated V2X service. The Application ID may be given to the V2X host application 214. Having received authorization from the ITS function 106 and registration from the V2X ProSe function 240/V2X ProSe function 242, the V2X host application 214 connects to the ITS function 106 to initialize the V2X services. This may include the establishment of an EPS bearer, using the obtained IP address, to result in a started service that is provided by the ITS function 106 and hosted via the V2X host application 214.

The V2X service application 250 in the V2X UE 110 is currently registered with a ProSe function (e.g., ProSe function 240/V2X ProSe function 242) or may have registered with the ProSe function previously. This registration occurs through the LTE user plane (e.g., LTE-Uu interface 120). As part of the V2X UE 110 registration, the V2X ProSe function (e.g., V2X ProSe function 242) verifies whether V2X RSU services are available at the UE's current location using the location of registered eNBs providing services and service capabilities supported by the V2X UE 110. The V2X ProSe function provides a list of available services and initial configuration information to the V2X UE 110 (to the V2X service application 250, for example). The configuration information may include a mapping of eNB identifiers (e.g., cell identifiers (IDs)) to RSU server IP addresses and corresponding service identifiers (e.g., PSID) within a certain geographical area relevant to the V2X UE 110.

Figure 5:
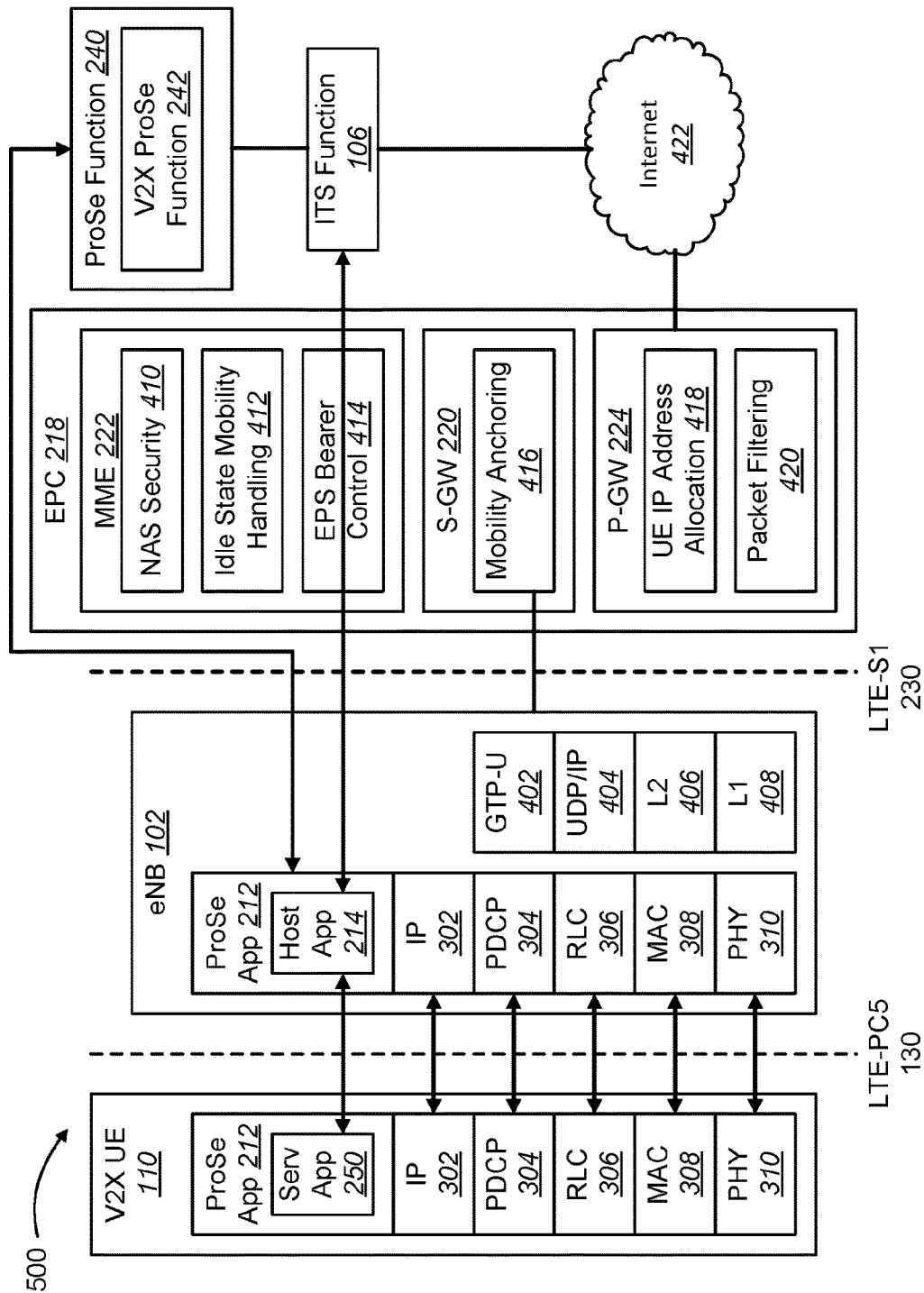
FIG. 5 is a block diagram illustrating one example of a UE connecting to an eNB that is enabled to host a V2X service.

The V2X service application 250 uses the V2X service configuration information to discover with the V2X host application 214 in an RSU (e.g., UE 104 as illustrated in FIG. 4, eNB 102 as illustrated in FIG. 5, or V2X UE 110 as illustrated in FIG. 1). In some cases, the V2X UE 110 uses the eNB that the V2X UE 110 is currently connected to (connected via an LTE-Uu interface 120 or a user plane, for example) as an RSU. The V2X service application 250, which is authorized by the V2X ProSe function 242 to utilize the V2X functions, listens to advertisements sent by devices operating as RSUs and/or eNBs. In one example, a device operating as an RSU (e.g., UE 104, eNB 102, or V2X UE 110) sends an advertisement in a direct discovery message over an LTE-PC5 interface 130. In another example, an eNB 102 sends an advertisement in a broadcast message over an LTE-Uu interface 120 (e.g., through the control plane). For instance, the advertisement is in a system information block (SIB) of a broadcast message.

The V2X service application 250, which is authorized by the V2X ProSe function 242 to utilize V2X functions, listens to advertisements sent by an RSU/eNB. The V2X service application 250 is informed of the application identity (e.g., Application ID) being used by RSUs based on the advertisements sent by the RSU/eNB. The application identity is the parameter that is used to identify the particular application that triggers the DISCOVERY_REQUEST message.

The ProSe host application 214 transmits a direct discovery request (e.g., a DISCOVERY_REQUEST) advertising that the ProSe host application 214 is acting as an RSU and/or hosting one or more V2X services. Accordingly, the direct discovery request is used to advertise an available service. Using ProSe to facilitate the discovery of and access to V2X services, V2X services can be geographically targeted (based on the location/coverage area of the device 210, for example) and V2X services may be accessed quickly using low latency ProSe protocols.

Additionally or alternatively, the V2X host application 214 transmits a broadcast message advertising that the V2X host application 214 is acting as an RSU and/or hosting one or more V2X services. The V2X host application 214 may announce its supported V2X services by transmitting a list of V2X service IDs (e.g., PSID) in a System Information Block (SIB). In one embodiment, a new SIB may be created for V2X services, which includes service identifiers, and an indication of whether V2X services are provided through the LTE-Uu interface 120 (e.g., user plane) and/or through the LTE-PC5 interface 130. If V2X services are offered through the LTE-PC5 interface 130, the V2X UE 110 retrieves the additional LTE-PC5 information from one or more SIBs (e.g., SIB 18 and SIB 19). Alternatively, the V2X service information is included as part of any existing SIBs, such as SIB 18 or SIB 19 for LTE-PC5 communications and discovery, respectively.

The V2X service application 250 uses the advertised V2X service information to decide which RSU (e.g., device 210 with a V2X host application 214) to connect to during initialization or during handovers. For example, the V2X service application 250 uses the mapping of services to host devices received from the V2X ProSe function 242, the advertisement included in a direct discovery message, and/ or the advertisement included in a SIB to decide which RSU to connect to during initialization or during handovers. If the V2X service application 250 decides to connect to a given RSU/eNB, it sends a request to the V2X ProSe function 242 to obtain the service configuration information (e.g., PSID, IP address). When the V2X service application 250 leaves the area of the current RSU, the V2X service application 250 may start monitoring the ProSe discovery messages (e.g., direct discovery messages) for another device announcing the RSU functionality.

When the V2X UE 110 performs a handover between eNBs or RSUs, the V2X service application 250 uses the RSU to V2X service mapping received from the V2X ProSe function 242 to identify whether the target device (e.g., eNB) supports the V2X services that the V2X service application 250 is currently using. In some cases, the V2X service application 250 sends a V2X service handover notification to the current V2X RSU including the address of the target device. The current RSU may forward V2X messages to the target device during the handover procedure. If V2X services are not available at the target device, the V2X service application 250 sends a request to the V2X ProSe function 242 to obtain up to date V2X service configuration information (e.g., PSID, IP address) from the V2X ProSe function 242. The configuration information may be for RSUs that are located in the nearby area of the V2X UE 110. The V2X ProSe function 242 may periodically send updated configuration information to the V2X service application 250 based on the location of the V2X UE 110. In one example, the frequency of the updates is based on the rate of change of the location of the V2X UE 110.

FIG. 5 is a block diagram illustrating one example 400 of a V2X UE 110 connecting to an eNB 102 that is enabled to host a V2X service. FIG. 5 illustrates that the V2X host application 214 is included in an eNB 102 and that the V2X host application 214 in an eNB 102 communicates directly with the V2X service application 250 in the V2X UE 110 via an LTE-PC5 interface 130.

The V2X host application 214 sends a request for authorization to operate as an RSU to the ITS function/server 106. The ITS server 106 may respond with an authorization and may provide specific configuration information for RSU operation. The ITS server 106 may be inside the operator domain or outside the operator domain. In some cases, the ITS server 106 is part of the V2X ProSe function 242 inside the operator domain. The configuration information for RSU operation may include a PSID. The V2X host application 214 sends a request for registering its V2X services with the V2X ProSe function 242 inside the operator domain. The V2X ProSe function 242 responds with an application identity (e.g., Application ID) to be used by the V2X host application 214 for direct discovery messages.

The V2X service application 250 performs initial authorization with the V2X ProSe function 242 in order to receive V2X services. The V2X ProSe function 242 provides a list of available services and initial configuration information to the V2X service application 250 and/or ProSe application 212. The initial configuration information may include a mapping of eNB identifiers (cell IDs) to RSU server IP addresses and corresponding service identifiers (e.g., PSID) within a certain geographical area relevant to the V2X UE 110. The initial configuration information may include an application identifier.

The V2X host application 214 (the eNB 102 operating as an RSU) may send the RSU configuration information in the broadcast channel. The V2X service application 250 used the information received from the V2X ProSe function 242 to identify whether an eNB is configured as an RSU and whether that eNB supports the V2X services the V2X UE 110 is currently using. The information received from the V2X ProSe function 242 may include the eNB to V2X service mapping. The information received from the V2X ProSe function 242 may also include the application code (e.g., the Application ID).

When the V2X UE 110 begins a handover procedure and V2X services are not available at the target eNB during the handover, the V2X service application 250 may request up to date V2X service configuration information from the V2X ProSe function 242. The V2X ProSe function may periodically send updated V2X service configuration information to the V2X service application 250 authorized for V2X services, based on the location of the V2X UE 110.

Figure 6:
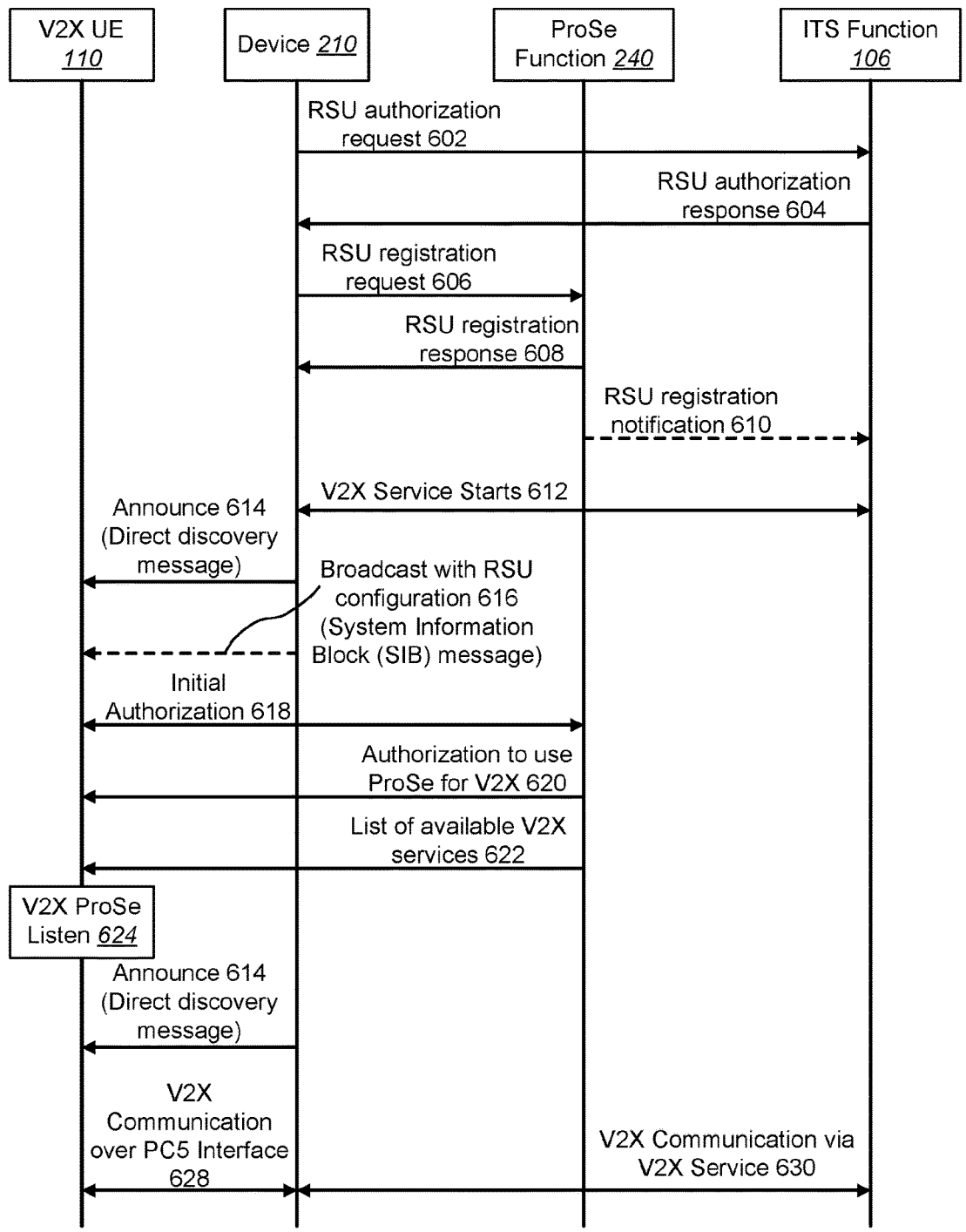
FIG. 6 is one example of a message sequence diagram for the described systems and methods.

FIG. 6 is one example of a message sequence diagram for the described systems and methods. Device 210 sends an RSU authorization request 602 to the ITS function 106. The authorization request 602 requests that the device 210 operate as an RSU and host one or more V2X services. Upon determining that the device 210 is authorized to act as an RSU and host one or more V2X services, the ITS function 106 sends an RSU authorization response 604 to the device 210 indicating that the device 210 is authorized to act as an RSU and host one or more V2X services. Upon receiving authorization, the device 210 sends an RSU registration request 606 to the ProSe function 240. The RSU registration request 606 is a request to register one or more V2X services with the ProSe function 240. The ProSe function 240 sends an RSU registration response 608 indicating that the one or more requested V2X services are registered with the ProSe function 240 and that the device 210 is authorized to host those registered V2X services within the operator network according to certain configuration parameters.

To verify that the device 210 is authorized to act as an RSU and host V2X services, the ProSe function 240 may send an RSU registration notification 610 to the ITS function 106. With the registration and authorization completed, the device 210 starts the V2X service 612. Starting the V2X service 612 includes setting up an EPS bearer (using an obtained IP address, for example) so that a V2X service provided by the ITS function 106 is hosted and made available by the device 210. With the V2X service started and available, the device 210 sends an announcement 614 (e.g., advertisement) of the V2X service via a direct discovery message. Additionally or alternatively, the device 210 sends a broadcast with RSU configuration information 616 in a SIB on a broadcast channel. Prior to the V2X UE 110 being initialized for ProSe V2X communication, the V2X UE 110 may ignore the announcement 614. In one example, the V2X UE 110 receives the broadcast with RSU configuration information 616 and proceeds with ProSe initiation based on that broadcast 616 so that it can access V2X services.

The V2X UE 110 sends an initial authorization 618 to the ProSe function 240. The initial authorization 618 is sent via the user plane. The ProSe function 240 authorizes the V2X UE 110 to utilize ProSe services for V2X communication by sending an authorization to use ProSe for V2X 620. The ProSe function 240 also sends a list of available V2X services 622. This list of available services 622 may include a mapping of devices to V2X services. Having received authorization to utilize ProSe for V2X services, the V2X UE 110 listens for ProSe messages 624.

Again, the device 210 sends an announcement 614 in a direct discovery message. The V2X UE 110 receives the announcement 614 and uses V2X communication over an LTE-PC5 interface 628 to access the V2X service hosted by the device 210. The device 210 enables the V2X communication via a V2X service with the ITS function 106.

Figure 7:
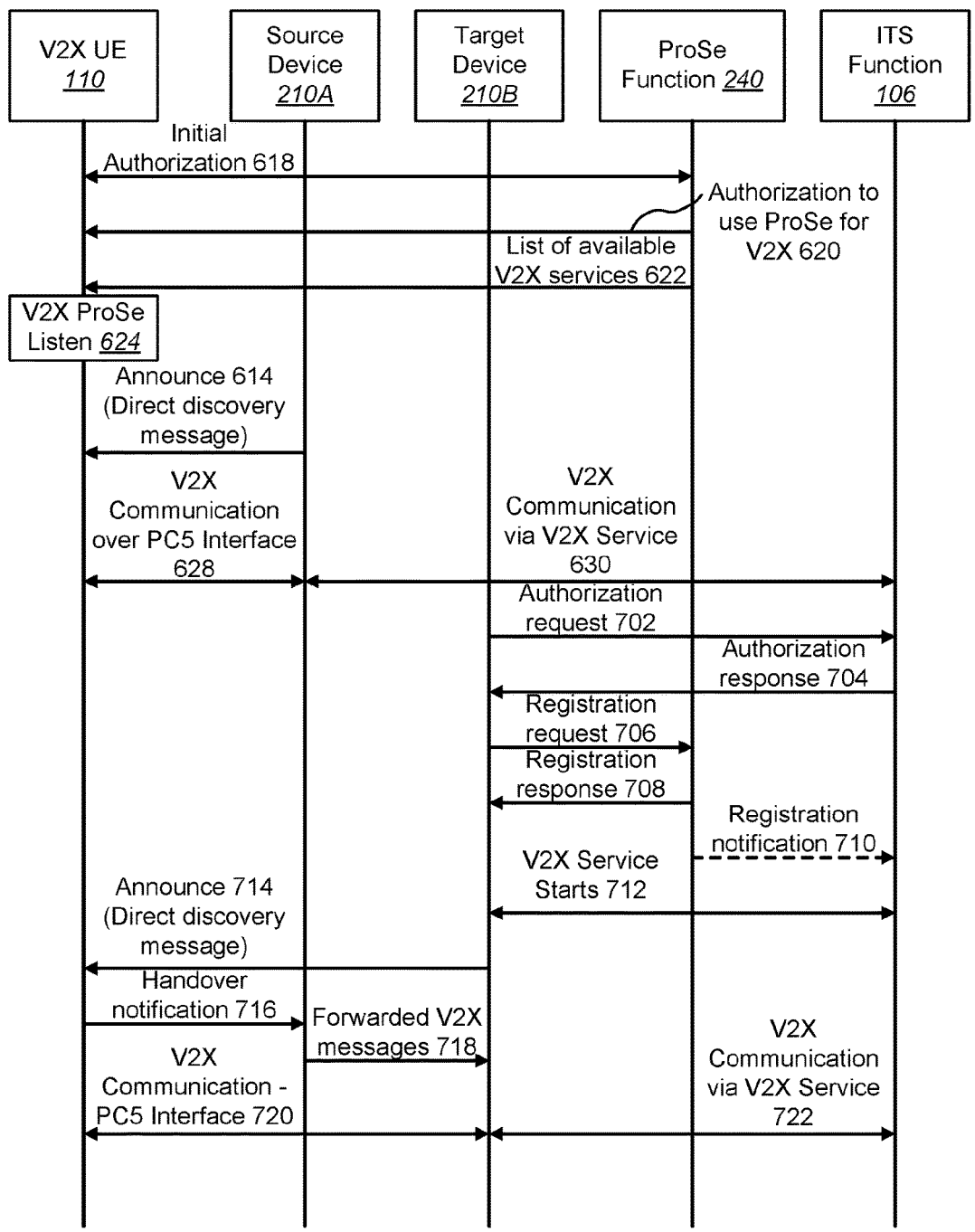
FIG. 7 is another example of a message sequence diagram for the described systems and methods.

FIG. 7 is another example of a message sequence diagram for the described systems and methods. As discussed with relation to FIG. 6, the V2X UE 110 performs initial authorization 618 with the ProSe function 240, receives authorization to use ProSe for V2X 620, and receives a list of available V2X services 622. Having been configured for V2X ProSe, the V2X UE 110 listens for V2X ProSe message 624. The V2X UE 110 receives an announcement 614 in a direct discovery message from a source device 210A and engages in V2X communication with the source device 210A over the LTE-PC5 interface 628. The source device 210A hosts V2X communication via a V2X service provided by the ITS function 106.

The target device 210B performs authorization and registration to be able to act as an RSU and host one or more V2X services. As discussed with respect to FIG. 6, the target device 210 sends an RSU authorization request 702 to the ITS function 106 and receives an RSU authorization response 704 from the ITS function 106. The target device 210B then sends an RSU registration request 706 to the ProSe function 240 and receives an RSU registration response 708 from the ProSe function 240. The ProSe function 240 may send an RSU registration notification 710 to the ITS function 106. The target device 210B starts the V2X service 712 and sends an announcement 714 to the V2X UE 110 in a direct discovery message.

The V2X UE 110 may determine to handover from the source device 210A to the target device 2106. As part of the handover procedure, the V2X UE 110 sends a handover notification 716 that identifies the target device 210B to the source device 210A. The source device 210A may forward one or more V2X messages 718 that it receives during the handover procedure to the target device 210B so that the V2X communication with the V2X UE 110 can transition smoothly between the source device 210A and the target device 210B. With the handover procedure, V2X communication with the target device 210B may be established over an LTE-PC5 interface 720. The target device 210B, which hosts the V2X service started at communication 712, may now host V2X communication via the V2X service 722.

Figure 8:
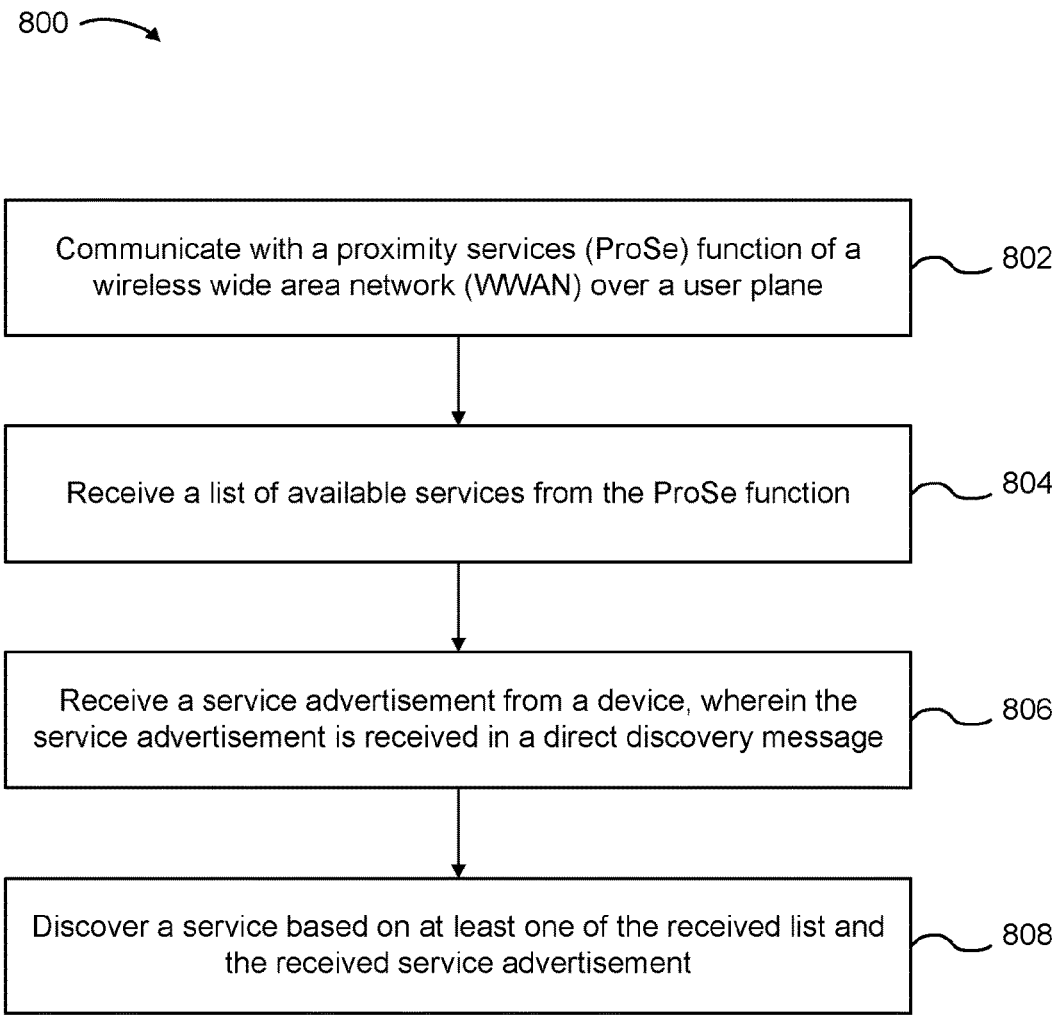
FIG. 8 is a flow diagram of a method for V2X communication.

FIG. 8 is a flow diagram of a method 800 for V2X communication. The method 800 is performed by the V2X UE 110 illustrated in FIGS. 1-7. In particular, the method 800 may be performed by the V2X service application 250 illustrated in FIGS. 2-5. Although the operations of method 800 are illustrated as being performed in a particular order, it is understood that the operations of method 800 may be reordered without departing from the scope of the method.

At 802, a UE may communicate with a ProSe function of a WWAN over a user plane. At 804, a list of available services is received from the ProSe function. At 806, a service advertisement is received from a device. The service advertisement may be received in a direct discovery message. At 808, a service is discovered based on at least one of the received list and the received service advertisement.

The operations of method 800 may be performed by an application specific processor, programmable application specific integrated circuit (ASIC), field programmable gate array (FPGA), or the like.

Figure 9:
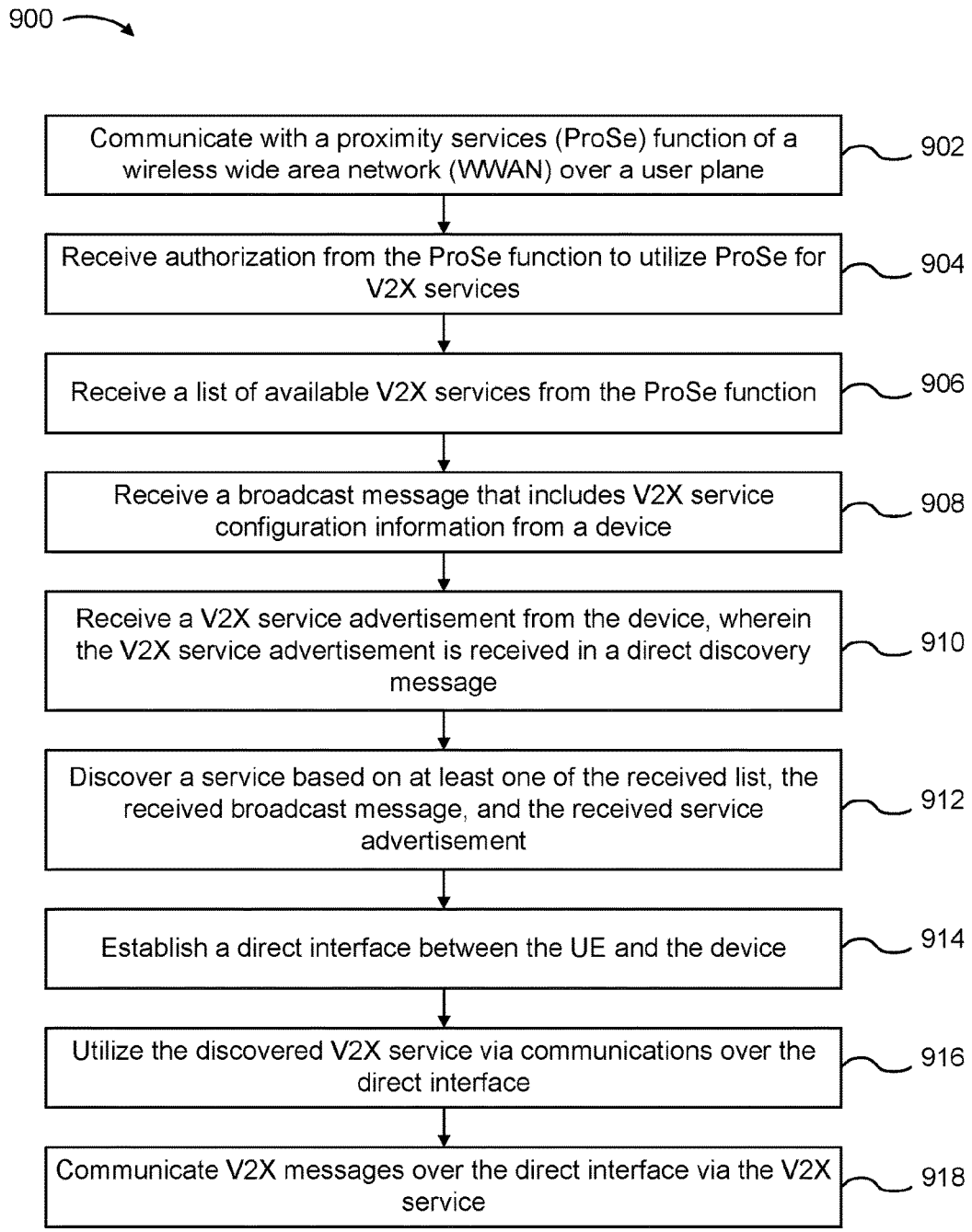
FIG. 9 is a flow diagram of a method for V2X communication.

FIG. 9 is a flow diagram of a method 900 for V2X communication. The method 900 is performed by the V2X UE 110 illustrated in FIGS. 1-7. In particular, the method 900 may be performed by the V2X service application 250 illustrated in FIGS. 2-5. Although the operations of method 900 are illustrated as being performed in a particular order, it is understood that the operations of method 900 may be reordered without departing from the scope of the method.

At 902, a UE may communicate with the ProSe function of a WWAN over a user plane. At 904, authorization to utilize ProSe for V2X services is received from the ProSe function. At 906, a list of available services is received from the ProSe function. At 908, a broadcast message that includes V2X service configuration information is received from a device. The V2X service configuration information may be received in a system information block (SIB) transmitted on a broadcast channel. At 910, a V2X service advertisement is received from the device. The V2X service advertisement may be received in a direct discovery message. At 912, a service is discovered based on at least one of the received list, the received broadcast message, and the received service advertisement. At 914, a direct interface between the UE and the device is established. At 916, the discovered V2X service is utilized via communications over the direct interface. The communications may include V2X messages carried over the LTE-PC5 interface. At 918, V2X messages are communicated over the direct interface via the V2X service.

The operations of method 900 may be performed by an application specific processor, programmable application specific integrated circuit (ASIC), field programmable gate array (FPGA), or the like.

Figure 10:
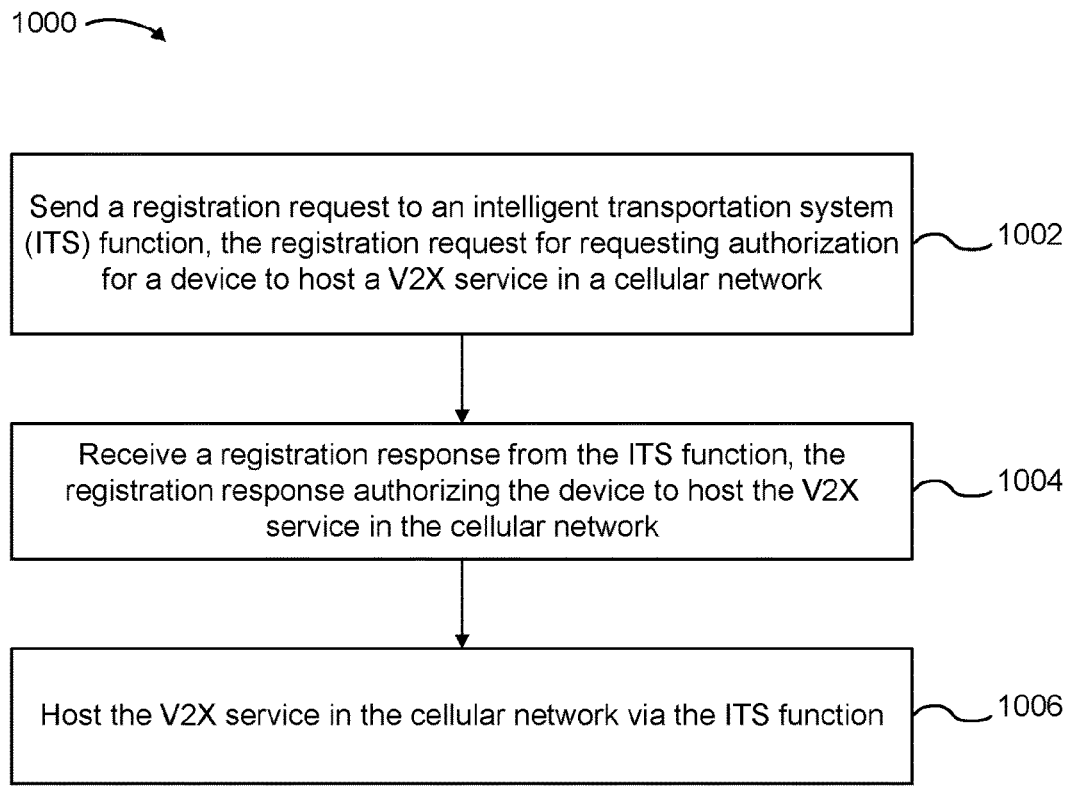
FIG. 10 is a flow diagram of a method for enabling V2X communication.

FIG. 10 is a flow diagram of a method 1000 for enabling V2X communication. The method 1000 is performed by the device 210 illustrated in FIGS. 2-7. In particular, the method 1000 may be performed by the V2X host application 214 illustrated in FIGS. 2-5. Although the operations of method 1000 are illustrated as being performed in a particular order, it is understood that the operations of method 1000 may be reordered without departing from the scope of the method.

At 1002, a registration request is sent to an ITS function. The registration request may request authorization for a device to host a V2X service in a cellular network. At 1004, a registration response is received from the ITS function. The registration response may authorize the device to host the V2X service in the cellular network. At 1006, the V2X service is hosted in the cellular network via the ITS function.

The operations of method 1000 may be performed by an application specific processor, programmable application specific integrated circuit (ASIC), field programmable gate array (FPGA), or the like.

Figure 11:
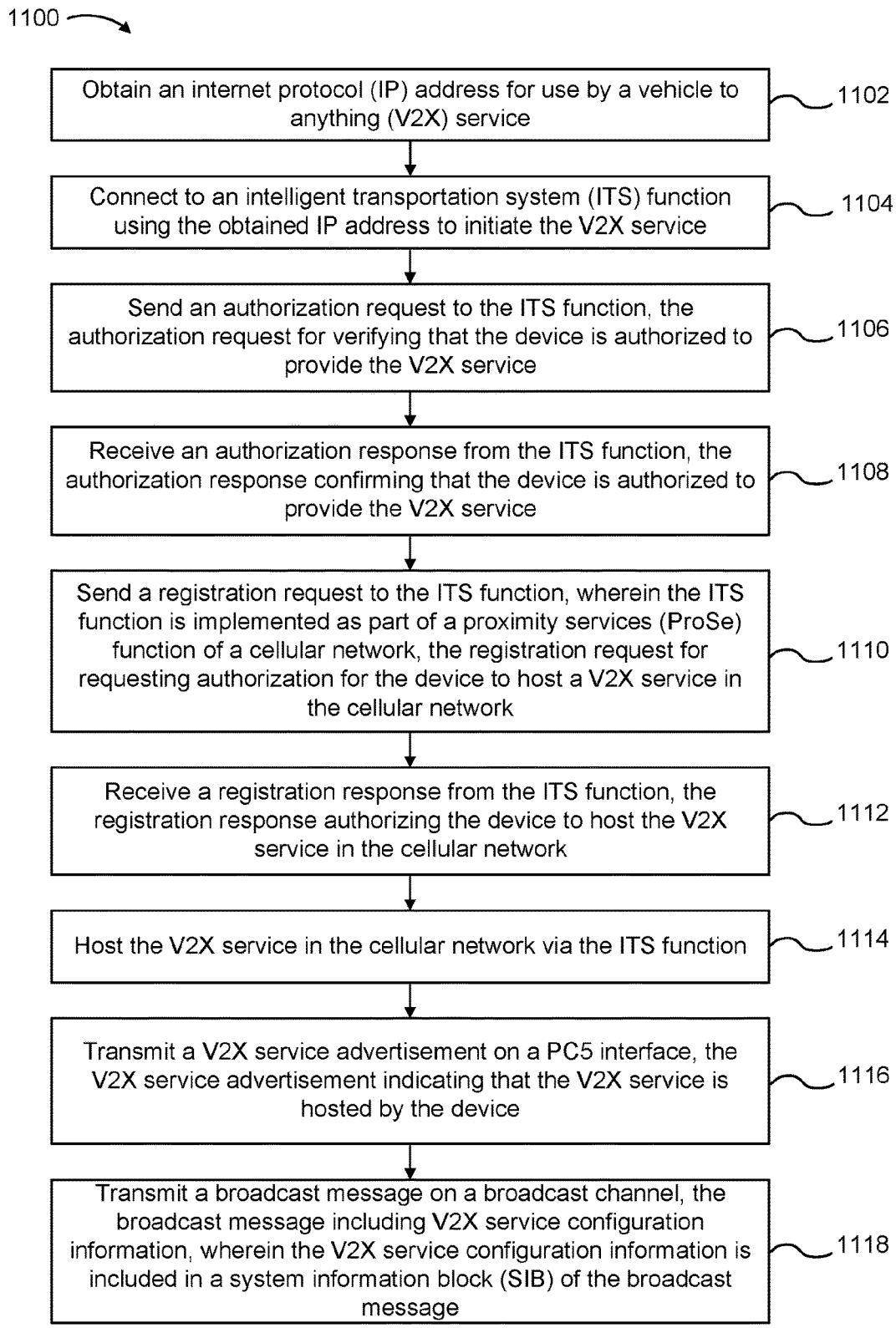
FIG. 11 is a flow diagram of a method for enabling V2X communication.

FIG. 11 is a flow diagram of a method 1100 for enabling V2X communication. The method 1100 is performed by the device 210 illustrated in FIGS. 2-7. In particular, the method 1100 may be performed by the V2X host application 214 illustrated in FIGS. 2-5. Although the operations of method 1100 are illustrated as being performed in a particular order, it is understood that the operations of method 1100 may be reordered without departing from the scope of the method.

At 1102, an internet protocol (IP) address is obtained for use by a vehicle to anything service. At 1104, an intelligent transportation system (ITS) function/server is connected to using the obtained IP address to initiate the V2X service. At 1106, an authorization request is sent to the ITS function/server. The authorization request may enable the ITS function/server to verify that the device is authorized to provide the V2X service. At 1108, an authorization response is received from the ITS server. The authorization response may confirm that the device is authorized to provide the V2X service. At 1110, a registration request is sent to the ITS function/server. The ITS function/server may be implemented as part of a proximity services (ProSe) function of a cellular network. The registration request may request authorization for a device to host a V2X service in the cellular network. At 1112, a registration response is received from the ITS function/server. The registration response may authorize the device to host the V2X service in the cellular network. At 1114, the V2X service is hosted in the cellular network via the ITS function. In some cases, the V2X service may be hosted using ProSe. At 1116, a V2X service advertisement is transmitted on a PC5 interface. The V2X service advertisement may indicate that the V2X service is hosted by the device. At 1118, a broadcast message is transmitted on a broadcast channel. The broadcast message includes V2X service configuration information. The V2X service configuration information may be included in a system information block (SIB) of the broadcast message.

The operations of method 1100 may be performed by an application specific processor, programmable application specific integrated circuit (ASIC), field programmable gate array (FPGA), or the like.

Figure 12:
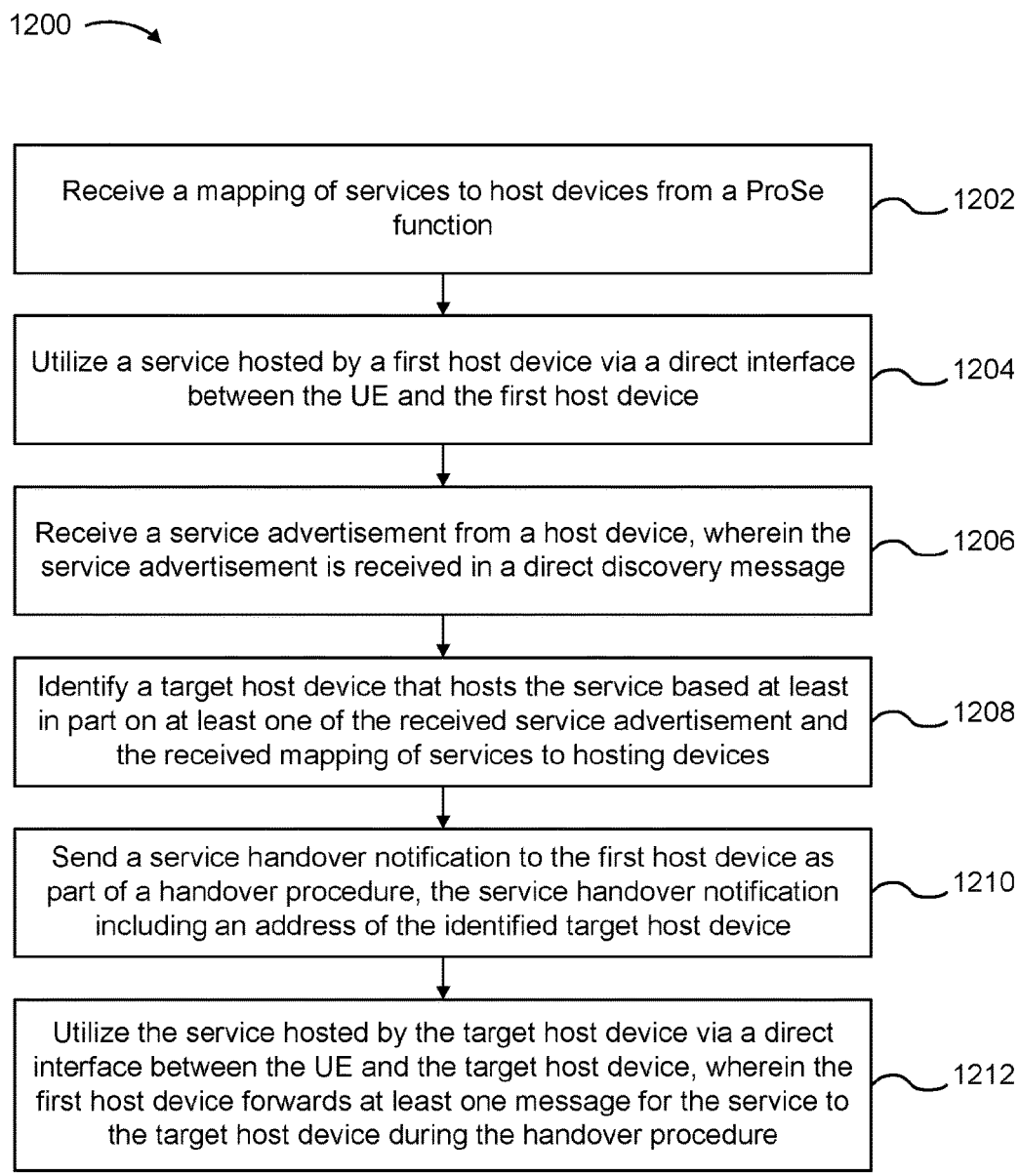
FIG. 12 is a flow diagram of a method for mobility management for V2X communication.

FIG. 12 is a flow diagram of a method 1200 for mobility management for V2X communication. The method 1200 is performed by the V2X UE 110 illustrated in FIGS. 1-7. In particular, the method 1200 may be performed by the V2X service application 250 illustrated in FIGS. 2-5. Although the operations of method 1200 are illustrated as being performed in a particular order, it is understood that the operations of method 1200 may be reordered without departing from the scope of the method.

At 1202, a mapping of services to host devices is received from a ProSe function. At 1204, a service hosted by a first host device is utilized via a direct interface between the UE and the first host device. At 1206, a service advertisement is received from a host device. The service advertisement may be received in a direct discovery message. At 1208, a target host device that hosts the service is identified based at least in part on at least one of the received service advertisement and the received mapping of services to hosting devices. At 1210, a service handover notification is sent to the first host device as part of a handover procedure. The service handover notification may include an address of the identified target host device. At 1212, the service hosted by the target host device is utilized via a direct interface between the UE and the target host device. The first host device may forward at least one message for the service to the target host device during the handover procedure. This may ensure that no service messages are lost during the handover procedure.

The operations of method 1200 may be performed by an application specific processor, programmable application specific integrated circuit (ASIC), field programmable gate array (FPGA), or the like.

Figure 13:
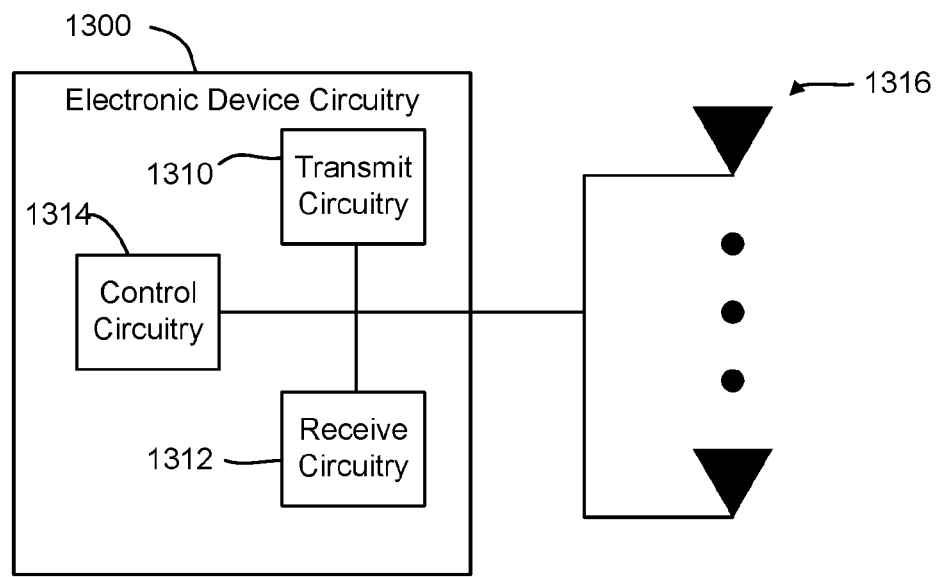
FIG. 13 is a block diagram illustrating electronic device circuitry that may be eNB circuitry, UE circuitry, network node circuitry, or some other type of circuitry in accordance with various embodiments.

FIG. 13 is a block diagram illustrating electronic device circuitry 1300 that may be eNB circuitry, UE circuitry, network node circuitry, or some other type of circuitry in accordance with various embodiments. In embodiments, the electronic device circuitry 1300 may be, or may be incorporated into or otherwise a part of, an eNB, a UE, a mobile station (MS), a BTS, a network node, or some other type of electronic device. In embodiments, the electronic device circuitry 1300 may include radio transmit circuitry 1310 and receive circuitry 1312 coupled to control circuitry 1314. In embodiments, the transmit circuitry 1310 and/or receive circuitry 1312 may be elements or modules of transceiver circuitry, as shown. The electronic device circuitry 1300 may be coupled with one or more plurality of antenna elements 1316 of one or more antennas. The electronic device circuitry 1300 and/or the components of the electronic device circuitry 1300 may be configured to perform operations similar to those described elsewhere in this disclosure.

In embodiments where the electronic device circuitry 1300 is or is incorporated into or otherwise part of a UE, the transmit circuitry 1310 can transmit initial authorization communications 618, V2X communications 628, 720, and/or V2X handover notifications 716, as shown in FIGS. 6 and 7. The receive circuitry 1312 can receive initial authorization communications 618, authorization to use ProSe for V2X 620, service advertising announcements 614, broadcasts 616 with SIB configuration information, lists of available V2X services 622, and/or V2X communications 628, 720, as shown in FIGS. 6 and 7.

In embodiments where the electronic device circuitry 1300 is an eNB, UE, BTS, and/or a network node, or is incorporated into or is otherwise part of an eNB, UE, BTS, and/or a network node, the transmit circuitry 1310 can transmit RSU authorization requests 602, 702, RSU registration requests 606, 706, V2X service initiation communications 612, 712, forwarded V2X messages 718, V2X communications over PC5 628, 720, and/or V2X communications 630, 722, as shown in FIGS. 6 and 7. The receive circuitry 1312 can receive RSU authorization responses 604, 704, RSU registration responses 608, 708, V2X service initiation communications 612, 712, V2X communications over PC5 628, 720, V2X communications via V2X service 630, 722, and/or forwarded V2X messages 718, as shown in FIGS. 6 and 7.

In certain embodiments, the electronic device circuitry 1300 shown in FIG. 13 is operable to perform one or more methods, such as the methods shown in FIGS. 8-12.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 14:
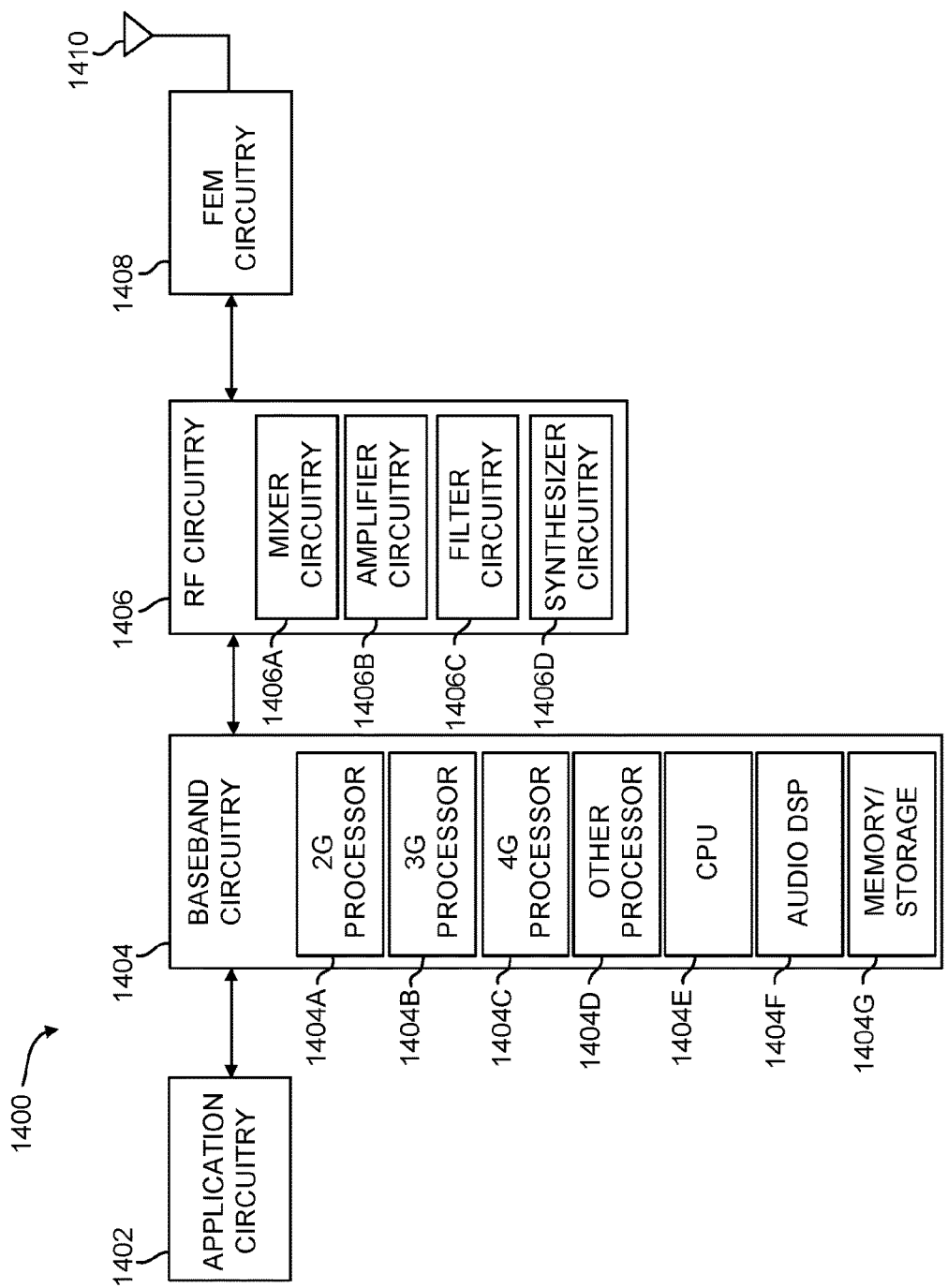
FIG. 14 is a block diagram illustrating, for one embodiment, example components of a UE, MS device, or eNB.

Embodiments described herein may be implemented into a system using any suitably configured hardware and/or software. FIG. 14 is a block diagram illustrating, for one embodiment, example components of a V2X user equipment (UE), UE, mobile station (MS) device, or evolved Node B (eNB) 1400. In some embodiments, the UE device 1400 may include application circuitry 1402, baseband circuitry 1404, Radio Frequency (RF) circuitry 1406, front-end module (FEM) circuitry 1408, and one or more antennas 1410, coupled together at least as shown in FIG. 14.

The application circuitry 1402 may include one or more application processors. By way of non-limiting example, the application circuitry 1402 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 1404 may include one or more single-core or multi-core processors. The baseband circuitry 1404 may include one or more baseband processors and/or control logic. The baseband circuitry 1404 may be configured to process baseband signals received from a receive signal path of the RF circuitry 1406. The baseband 1404 may also be configured to generate baseband signals for a transmit signal path of the RF circuitry 1406. The baseband processing circuitry 1404 may interface with the application circuitry 1402 for generation and processing of the baseband signals, and for controlling operations of the RF circuitry 1406.

By way of non-limiting example, the baseband circuitry 1404 may include at least one of a second generation (2G) baseband processor 1404A, a third generation (3G) baseband processor 1404B, a fourth generation (4G) baseband processor 1404C, other baseband processor(s) 1404D for other existing generations, and generations in development or to be developed in the future (e.g., fifth generation (5G), 6G, etc.). The baseband circuitry 1404 (e.g., at least one of baseband processors 1404A-1404D) may handle various radio control functions that enable communication with one or more radio networks via the RF circuitry 1406. By way of non-limiting example, the radio control functions may include signal modulation/demodulation, encoding/decoding, radio frequency shifting, other functions, and combinations thereof. In some embodiments, modulation/demodulation circuitry of the baseband circuitry 1404 may be programmed to perform Fast-Fourier Transform (FFT), precoding, constellation mapping/demapping functions, other functions, and combinations thereof. In some embodiments, encoding/decoding circuitry of the baseband circuitry 1404 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 1404 may include elements of a protocol stack. By way of non-limiting example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 1404E of the baseband circuitry 1404 may be programmed to run elements of the protocol stack for signaling of the PHY, MAC, RLC, PDCP and/or RRC layers. In some embodiments, the baseband circuitry 1404 may include one or more audio digital signal processor(s) (DSP) 1404F. The audio DSP(s) 1404F may include elements for compression/decompression and echo cancellation. The audio DSP(s) 1404F may also include other suitable processing elements.

The baseband circuitry 1404 may further include memory/storage 1404G. The memory/storage 1404G may include data and/or instructions for operations performed by the processors of the baseband circuitry 1404 stored thereon. In some embodiments, the memory/storage 1404G may include any combination of suitable volatile memory and/or non-volatile memory. The memory/storage 1404G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 1404G may be shared among the various processors or dedicated to particular processors.

Components of the baseband circuitry 1404 may be suitably combined in a single chip, a single chipset, or disposed on a same circuit board in some embodiments. In some embodiments, some or all of the constituent components of the baseband circuitry 1404 and the application circuitry 1402 may be implemented together, such as, for example, on a system on a chip (SOC).

In some embodiments, the baseband circuitry 1404 may provide for communication compatible with one or more radio technologies. For example, in some embodiments, the baseband circuitry 1404 may support communication with an evolved universal terrestrial radio access network (E-UTRAN) and/or other wireless metropolitan area networks (WMAN), a wireless local area network (WLAN), or a wireless personal area network (WPAN). Embodiments in which the baseband circuitry 1404 is configured to support radio communications of more than one wireless protocol may be referred to as multi-mode baseband circuitry.

The RF circuitry 1406 may enable communication with wireless networks using modulated electromagnetic radiation through a non-solid medium. In various embodiments, the RF circuitry 1406 may include switches, filters, amplifiers, etc. to facilitate the communication with the wireless network. The RF circuitry 1406 may include a receive signal path which may include circuitry to down-convert RF signals received from the FEM circuitry 1408, and provide baseband signals to the baseband circuitry 1404. The RF circuitry 1406 may also include a transmit signal path which may include circuitry to up-convert baseband signals provided by the baseband circuitry 1404, and provide RF output signals to the FEM circuitry 1408 for transmission.

In some embodiments, the RF circuitry 1406 may include a receive signal path and a transmit signal path. The receive signal path of the RF circuitry 1406 may include mixer circuitry 1406A, amplifier circuitry 1406B, and filter circuitry 1406C. The transmit signal path of the RF circuitry 1406 may include filter circuitry 1406C and mixer circuitry 1406A. The RF circuitry 1406 may further include synthesizer circuitry 1406D configured to synthesize a frequency for use by the mixer circuitry 1406A of the receive signal path and the transmit signal path. In some embodiments, the mixer circuitry 1406A of the receive signal path may be configured to down-convert RF signals received from the FEM circuitry 1408 based on the synthesized frequency provided by synthesizer circuitry 1406D. The amplifier circuitry 1406B may be configured to amplify the down-converted signals.

The filter circuitry 1406C may include a low-pass filter (LPF) or band-pass filter (BPF) configured to remove unwanted signals from the down-converted signals to generate output baseband signals. Output baseband signals may be provided to the baseband circuitry 1404 for further processing. In some embodiments, the output baseband signals may include zero-frequency baseband signals, although this is not a requirement. In some embodiments, the mixer circuitry 1406A of the receive signal path may comprise passive mixers, although the scope of the embodiments is not limited in this respect.

In some embodiments, the mixer circuitry 1406A of the transmit signal path may be configured to up-convert input baseband signals based on the synthesized frequency provided by the synthesizer circuitry 1406D to generate RF output signals for the FEM circuitry 1408. The baseband signals may be provided by the baseband circuitry 1404 and may be filtered by filter circuitry 1406C. The filter circuitry 1406C may include a low-pass filter (LPF), although the scope of the embodiments is not limited in this respect. In some embodiments, the mixer circuitry 1406A of the receive signal path and the mixer circuitry 1406A of the transmit signal path may include two or more mixers, and may be arranged for quadrature downconversion and/or upconversion, respectively. In some embodiments, the mixer circuitry 1406A of the receive signal path and the mixer circuitry 1406A of the transmit signal path may include two or more mixers and may be arranged for image rejection (e.g., Hartley image rejection). In some embodiments, the mixer circuitry 1406A of the receive signal path and the mixer circuitry 1406A may be arranged for direct downconversion and/or direct upconversion, respectively. In some embodiments, the mixer circuitry 1406A of the receive signal path and the mixer circuitry 1406A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In such embodiments, the RF circuitry 1406 may include analog-to-digital converter (ADC) and digital-to-analog converter (DAC) circuitry, and the baseband circuitry 1404 may include a digital baseband interface to communicate with the RF circuitry 1406.

In some dual-mode embodiments, separate radio IC circuitry may be provided for processing signals for each spectrum, although the scope of the embodiments is not limited in this respect.

In some embodiments, the synthesizer circuitry 1406D may include one or more of a fractional-N synthesizer and a fractional N/N+1 synthesizer, although the scope of the embodiments is not limited in this respect as other types of frequency synthesizers may be suitable. For example, synthesizer circuitry 1406D may include a delta-sigma synthesizer, a frequency multiplier, a synthesizer comprising a phase-locked loop with a frequency divider, other synthesizers, and combinations thereof.

The synthesizer circuitry 1406D may be configured to synthesize an output frequency for use by the mixer circuitry 1406A of the RF circuitry 1406 based on a frequency input and a divider control input. In some embodiments, the synthesizer circuitry 1406D may be a fractional N/N+1 synthesizer.

In some embodiments, frequency input may be provided by a voltage controlled oscillator (VCO), although that is not a requirement. Divider control input may be provided by either the baseband circuitry 1404 or the applications processor 1402 depending on the desired output frequency. In some embodiments, a divider control input (e.g., N) may be determined from a look-up table based on a channel indicated by the applications processor 1402.

The synthesizer circuitry 1406D of the RF circuitry 1406 may include a divider, a delay-locked loop (DLL), a multiplexer, and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump, and a D-type flip-flop. In such embodiments, the delay elements may be configured to break a VCO period into Nd equal packets of phase, where Nd is the number of delay elements in the delay line. In this way, the DLL may provide negative feedback to help ensure that the total delay through the delay line is one VCO cycle.

In some embodiments, the synthesizer circuitry 1406D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 1406 may include an IQ/polar converter.

The FEM circuitry 1408 may include a receive signal path which may include circuitry configured to operate on RF signals received from one or more antennas 1410, amplify the received signals, and provide the amplified versions of the received signals to the RF circuitry 1406 for further processing. The FEM circuitry 1408 may also include a transmit signal path which may include circuitry configured to amplify signals for transmission provided by the RF circuitry 1406 for transmission by at least one of the one or more antennas 1410.

In some embodiments, the FEM circuitry 1408 may include a TX/RX switch configured to switch between a transmit mode and a receive mode operation. The FEM circuitry 1408 may include a receive signal path and a transmit signal path. The receive signal path of the FEM circuitry 1408 may include a low-noise amplifier (LNA) to amplify received RF signals and provide the amplified received RF signals as an output (e.g., to the RF circuitry 1406). The transmit signal path of the FEM circuitry 1408 may include a power amplifier (PA) configured to amplify input RF signals (e.g., provided by RF circuitry 1406), and one or more filters configured to generate RF signals for subsequent transmission (e.g., by one or more of the one or more antennas 1410).

In some embodiments, the MS device 1400 may include additional elements such as, for example, memory/storage, a display, a camera, one or more sensors, an input/output (I/O) interface, other elements, and combinations thereof.

In some embodiments, the MS device 1400 may be configured to perform one or more processes, techniques, and/or methods as described herein, or portions thereof.

EXAMPLES

The following examples pertain to further embodiments.

Example 1 is an apparatus of a device for hosting vehicle to anything (V2X) communication. The device includes one or more processors. The one or more processors send a registration request to an intelligent transportation system (ITS) function, the registration request for requesting authorization for the device to host a V2X service in a cellular network, receive a registration response from the ITS function, the registration response authorizing the device to host the V2X service in the cellular network, and host the V2X service in the cellular network via the ITS function.

Example 2 includes the apparatus of claim 1, where the ITS function is implemented as part of a proximity services (ProSe) function of the cellular network.

Example 3 includes the apparatus of claim 1, where the ITS function is implemented as part of a new entity in the cellular network.

Example 4 includes the apparatus of claim 1, where the ITS function is external to the cellular network.

Example 5 includes the apparatus of claim 1, where the one or more processors send an authorization request to the ITS function, the authorization request for verifying that the device is authorized to provide the V2X service, and receive an authorization response from the ITS function, the authorization response confirming that the device is authorized to provide the V2X service.

Example 6 includes the apparatus of claim 1, where the one or more processors obtain an internet protocol (IP) address for use by the V2X service.

Example 7 includes the apparatus of claim 6, where the one or more processors connect to the ITS function using the obtained IP address, initiate the V2X service using the obtained IP address, and host the V2X service using the obtained IP address.

Example 8 includes the apparatus of claim 1, where the one or more processors transmit a V2X service advertisement on a PC5 interface, the V2X service advertisement indicating that the V2X service is hosted by the device.

Example 9 includes the apparatus of claim 8, where the V2X service advertisement is transmitted in broadcast form to all nearby devices.

Example 10 includes the apparatus of claim 8, where the V2X service advertisement is sent in a direct communication message.

Example 11 includes the apparatus of claim 10, where the direct communication message is a direct discovery message.

Example 12 includes the apparatus of claim 1, where the one or more processors transmit a broadcast message on a broadcast channel, the broadcast message including V2X service configuration information, where the V2X service configuration information is included in a system information block (SIB) of the broadcast message.

Example 13 includes the apparatus of claim 1, where the registration request includes one or more of a service identifier for the V2X service, a link layer address for the device, and location information for the device.

Example 14 includes the apparatus of claim 1, where the device is at least one of an evolved Node B (eNB) or a user equipment (UE).

Example 15 includes a user equipment (UE). The UE includes one or more processors. The one or more processors receive a mapping of services to host devices from a ProSe function, utilize a service hosted by a first host device via a direct interface between the UE and the first host device, identify a target host device that hosts the service based at least in part on the received mapping of services to hosting devices, send a service handover notification to the first host device as part of a handover procedure, the service handover notification including an address of the identified target host device, and utilize the service hosted by the target host device via a direct interface between the UE and the target host device, where the first host device forwards at least one message for the service to the target host device during the handover procedure.

Example 16 includes the UE of claim 15, where the target host device is identified based on an advertisement received from the target host device, the advertisement indicating that the target host device is hosting the service.

Example 17 includes the UE of claim 16, where the advertisement is received in a direct communication message from the target host device.

Example 18 includes the UE of claim 17, where the direct communication message is a direct discovery message.

Example 19 includes the UE of claim 16, where the advertisement is received in a system information broadcast from the target host device.

Example 20 includes the UE of claim 19, where the advertisement is included in at least one system information block (SIB) of the system information broadcast, and where the at least one SIB is SIB 18 and/or SIB 19.

Example 21 includes the UE of claim 15, where the direct interface between the UE and the first host device and the direct interface between the UE and the target host device are PC5 interfaces.

Example 22 includes the UE of claim 15 or 16, where the service is a vehicle to anything (V2X) service.

Example 23 includes a user equipment (UE). The UE includes one or more processors. The one or more processors communicate with a proximity services (ProSe) function of a wireless wide area network (WWAN) over a user plane, receive a list of available V2X services from the ProSe function, receive a V2X service advertisement from a device, where the V2X service advertisement is received in a direct discovery message, and discover a V2X service based on at least one of the received list and the received service advertisement.

Example 24 includes the UE of claim 23, where the one or more processors establish a direct interface between the UE and the device, and utilize the discovered V2X service via communications over the direct interface.

Example 25 includes a method for hosting vehicle to anything (V2X) communication. The method includes sending a registration request to an intelligent transportation system (ITS) function, the registration request for requesting authorization for a device to host a V2X service in a cellular network, receiving a registration response from the ITS function, the registration response authorizing the device to host the V2X service in the cellular network, and hosting the V2X service in the cellular network via the ITS function.

Example 26 includes the method of claim 25, where the ITS function is implemented as part of a proximity services (ProSe) function of the cellular network.

Example 27 includes the method of claim 25, where the ITS function is implemented as part of a new entity in the cellular network.

Example 28 includes the method of claim 25, where the ITS function is external to the cellular network.

Example 29 includes the method of claim 25, where the method includes sending an authorization request to the ITS function, the authorization request for verifying that the device is authorized to provide the V2X service, and receiving an authorization response from the ITS function, the authorization response confirming that the device is authorized to provide the V2X service.

Example 30 includes the method of claim 25, where the method includes obtaining an internet protocol (IP) address for use by the V2X service.

Example 31 includes the method of claim 30, where the method includes connecting to the ITS function using the obtained IP address, initiating the V2X service using the obtained IP address, and hosting the V2X service using the obtained IP address.

Example 32 includes the method of claim 25, where the method includes transmitting a V2X service advertisement on a PC5 interface, the V2X service advertisement indicating that the V2X service is hosted by the device.

Example 33 includes the method of claim 32, where the V2X service advertisement is transmitted in broadcast form to all nearby devices.

Example 34 includes the method of claim 32, where the V2X service advertisement is sent in a direct communication message.

Example 35 includes the method of claim 34, where the direct communication message is a direct discovery message.

Example 36 includes the method of claim 25, where the method includes transmitting a broadcast message on a broadcast channel, the broadcast message including V2X service configuration information, where the V2X service configuration information is included in a system information block (SIB) of the broadcast message.

Example 37 includes the method of claim 25, where the registration request includes one or more of a service identifier for the V2X service, a link layer address for the device, and location information for the device.

Example 38 includes the method of claim 25, where the device is either an evolved Node B (eNB) or a user equipment (UE).

Example 39 includes a method for wireless communication. The method includes receiving a mapping of services to host devices from a ProSe function, utilizing a service hosted by a first host device via a direct interface between the UE and the first host device, identifying a target host device that hosts the service based at least in part on the received mapping of services to hosting devices, sending a service handover notification to the first host device as part of a handover procedure, the service handover notification including an address of the identified target host device, and utilizing the service hosted by the target host device via a direct interface between the UE and the target host device, where the first host device forwards at least one message for the service to the target host device during the handover procedure.

Example 40 includes the method of claim 39, where the target host device is identified based on an advertisement received from the target host device, the advertisement indicating that the target host device is hosting the service.

Example 41 includes the method of claim 40, where the advertisement is received in a direct communication message from the target host device.

Example 42 includes the method of claim 41, where the direct communication message comprises a direct discovery message.

Example 43 includes the method of claim 40, where the advertisement is received in a system information broadcast from the target host device.

Example 44 includes the method of claim 43, where the advertisement is included in at least one system information block (SIB) of the system information broadcast, and where the at least one SIB is SIB 18 and/or SIB 19.

Example 45 includes the method of claim 39, where the direct interface between the UE and the first host device and the direct interface between the UE and the target host device are PC5 interfaces.

Example 46 includes the method of claim 39 or 40, where the service is a vehicle to anything (V2X) service.

Example 47 includes a method for V2X communication. The method includes communicating with a proximity services (ProSe) function of a wireless wide area network (WWAN) over a user plane, receiving a list of available V2X services from the ProSe function, receiving a V2X service advertisement from a device, where the V2X service advertisement is received in a direct discovery message, and discovering a V2X service based on at least one of the received list and the received service advertisement.

Example 48 includes the method of claim 47, where the method includes establishing a direct interface between the UE and the device, and utilizing the discovered V2X service via communications over the direct interface.

Example 49 includes an apparatus that includes means for performing the method of any of examples 25-48.

Example 50 includes a machine-readable storage including machine-readable instructions, when executed, to implement a method or realize an apparatus as claimed in any of examples 25-48.

Some of the infrastructure that can be used with embodiments disclosed herein is already available, such as general-purpose computers, mobile phones, computer programming tools and techniques, digital storage media, and communications networks. A computing device may include a processor such as a microprocessor, microcontroller, logic circuitry, or the like. The computing device may include a computer-readable storage device such as non-volatile memory, static random access memory (RAM), dynamic RAM, read-only memory (ROM), disk, tape, magnetic, optical, flash memory, or other computer-readable storage medium.

Various aspects of certain embodiments may be implemented using hardware, software, firmware, or a combination thereof. A component or module may refer to, be part of, or include an application specific integrated circuit (ASIC), an electronic circuit, a processor (shared, dedicated, or group), and/or memory (shared, dedicated or group) that execute one or more software or firmware programs, a combinational logic circuit, and/or other suitable components that provide the described functionality. As used herein, a software module or component may include any type of computer instruction or computer executable code located within or on a non-transitory computer-readable storage medium. A software module or component may, for instance, comprise one or more physical or logical blocks of computer instructions, which may be organized as a routine, program, object, component, data structure, etc., which performs one or more tasks or implements particular abstract data types.

In certain embodiments, a particular software module or component may comprise disparate instructions stored in different locations of a computer-readable storage medium, which together implement the described functionality of the module or component. Indeed, a module or component may comprise a single instruction or many instructions, and may be distributed over several different code segments, among different programs, and across several computer-readable storage media. Some embodiments may be practiced in a distributed computing environment where tasks are performed by a remote processing device linked through a communications network.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope should, therefore, be determined only by the following claims.

The invention claimed is:

1. An apparatus of a device for hosting vehicle to anything (V2X) communication, the device comprising:
one or more processors to:
send a registration request to an intelligent transportation system (ITS) function, the registration request for requesting authorization for the device to host a V2X service in a cellular network;
receive a registration response from the ITS function, the registration response authorizing the device to host the V2X service in the cellular network; and
host the V2X service in the cellular network via the ITS function.

2. The apparatus of claim 1, wherein the ITS function is implemented as part of a proximity services (ProSe) function of the cellular network.

3. The apparatus of claim 1, wherein the ITS function is implemented as part of a new entity in the cellular network.

4. The apparatus of claim 1, wherein the ITS function is external to the cellular network.

5. The apparatus of claim 1, wherein the one or more processors are further to:
send an authorization request to the ITS function, the authorization request for verifying that the device is authorized to provide the V2X service; and
receive an authorization response from the ITS function, the authorization response confirming that the device is authorized to provide the V2X service.

6. The apparatus of claim 1, wherein the one or more processors are further to:
obtain an internet protocol (IP) address for use by the V2X service;
connect to the ITS function using the obtained IP address;
initiate the V2X service using the obtained IP address; and
host the V2X service using the obtained IP address.

7. The apparatus of claim 1, wherein the one or more processors are further to:
transmit a V2X service advertisement on a PC5 interface, the V2X service advertisement indicating that the V2X service is hosted by the device, wherein the V2X service advertisement is transmitted in broadcast form to all nearby devices, and wherein the V2X service advertisement is sent in a direct communication message, wherein the direct communication message comprises a direct discovery message.

8. The apparatus of claim 1, wherein the one or more processors are further to:
transmit a broadcast message on a broadcast channel, the broadcast message including V2X service configuration information, wherein the V2X service configuration information is included in a system information block (SIB) of the broadcast message.

9. The apparatus of claim 1, wherein the registration request includes one or more of a service identifier for the V2X service, a link layer address for the device, and location information for the device.

10. The apparatus of claim 1, wherein the device is at least one of an evolved Node B (eNB) or a user equipment (UE).

11. A method for hosting vehicle to anything (V2X) communication, comprising:
sending a registration request to an intelligent transportation system (ITS) function, the registration request for requesting authorization for a device to host a V2X service in a cellular network;
receiving a registration response from the ITS function, the registration response authorizing the device to host the V2X service in the cellular network; and
hosting the V2X service in the cellular network via the ITS function.

12. The method of claim 11, wherein the ITS function is implemented as part of a proximity services (ProSe) function of the cellular network.

13. The method of claim 11, further comprising:
sending an authorization request to the ITS function, the authorization request for verifying that the device is authorized to provide the V2X service; and
receiving an authorization response from the ITS function, the authorization response confirming that the device is authorized to provide the V2X service.

14. The method of claim 11, further comprising
obtaining an internet protocol (IP) address for use by the V2X service;
connecting to the ITS function using the obtained IP address;
initiating the V2X service using the obtained IP address; and
hosting the V2X service using the obtained IP address.

15. The method of claim 11, further comprising:
transmitting a V2X service advertisement on a PC5 interface, the V2X service advertisement indicating that the V2X service is hosted by the device, wherein the V2X service advertisement is transmitted in broadcast form to all nearby devices, wherein the V2X service advertisement is sent in a direct communication message, and wherein the direct communication message comprises a direct discovery message.

16. The method of claim 11, further comprising:
transmitting a broadcast message on a broadcast channel, the broadcast message including V2X service configuration information, wherein the V2X service configuration information is included in a system information block (SIB) of the broadcast message, and wherein the registration request includes one or more of a service identifier for the V2X service, a link layer address for the device, and location information for the device.

* * * * *